United States Patent [19]

Murayama et al.

[11] Patent Number: 5,231,173
[45] Date of Patent: Jul. 27, 1993

[54] DISAZO METAL CHELATE COMPOUNDS FOR OPTICAL RECORDING MEDIA

[75] Inventors: Tetsuo Murayama, Machida; Shuichi Maeda, Hidaka; Satoru Imamura, Machida; Masako Takeuchi; Takumi Nagao, both of Yokohama, all of Japan

[73] Assignee: Mitsubishi Kasei Corporation, Tokyo, Japan

[21] Appl. No.: 776,256

[22] PCT Filed: Mar. 19, 1991

[86] PCT No.: PCT/JP91/00365

§ 371 Date: Jan. 14, 1992

§ 102(e) Date: Jan. 14, 1992

[87] PCT Pub. No.: WO91/14740

PCT Pub. Date: Oct. 3, 1991

[30] Foreign Application Priority Data

Mar. 19, 1990 [JP] Japan ................................ 2-68967
May 8, 1990 [JP] Japan ................................ 2-118197
Jun. 6, 1990 [JP] Japan ................................ 2-147705
Oct. 1, 1990 [JP] Japan ................................ 2-263627

[51] Int. Cl.$^5$ .......................... C09B 45/24; G11B 7/24
[52] U.S. Cl. .................................. 534/704; 534/709; 534/761
[58] Field of Search ............... 534/726, 727, 757, 761, 534/704, 709

[56] References Cited

U.S. PATENT DOCUMENTS

| 4,124,581 | 7/1978 | Vor der Bruck | 534/645 X |
| 4,207,233 | 6/1980 | Seybold et al. | 534/757 X |
| 4,908,435 | 3/1990 | Gregory | 534/757 X |

FOREIGN PATENT DOCUMENTS

| 943661 | 5/1956 | Fed. Rep. of Germany . |
| 52-76331 | 6/1977 | Japan . |
| 54-60221 | 1/1979 | Japan . |
| 54-141820 | 11/1979 | Japan | 534/707 |
| 58-96655 | 6/1983 | Japan | 534/761 |
| 62-30090 | 2/1987 | Japan . |
| 62-13461 | 1/1988 | Japan | 534/761 |

OTHER PUBLICATIONS

Furukawa, Analytica Chimica Acta, 140(1982) 281-289.
Nakajo et al, Chemical Abstracts, vol. 81, No. 65182c (1974).

Primary Examiner—Mary C. Lee
Assistant Examiner—Fiona T. Powers
Attorney, Agent, or Firm—Oblon, Spivak, McClelland, Maier & Neustadt

[57] ABSTRACT

A metal chelate compound of a dis-azo compound represented by the following formula (I) with a metal:

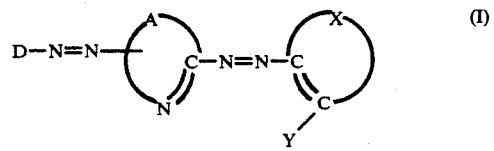

(wherein A is a residue forming a heterocyclic ring together with the carbon atom and the nitrogen atom to which it is bonded, X is a residue forming an aromatic group together with the two carbon atoms to which it is bonded, and D is an aromatic residue which may have a substituent, or a heterocyclic amine residue which may have a substituent, and Y is a group having active hydrogen) and an optical recording medium having a recording layer provided on a substrate so that information can be written in and/or read out by a laser, wherein the recording layer contains a metal chelate compound of the dis-azo compound represented by the above formula (I), with a metal.

10 Claims, 12 Drawing Sheets

DISAZO METAL CHELATE COMPOUNDS FOR OPTICAL RECORDING MEDIA

TECHNICAL FIELD

The present invention relates to a novel metal chelate compound of a dis-azo compound with a metal salt, and an optical recording medium employing it.

BACKGROUND TECHNIQUE

Optical recording employing a laser makes the storage of high density information recording and its reproduction possible. Accordingly, its development has been remarkably proceeded in recent years.

As an example of an optical recording medium, an optical disc may be mentioned. In general, an optical disc is designed so that high density information recording is conducted by irradiating a laser beam focused to about 1 μm to a thin recording layer provided on a disc-shape substrate. The recording is conducted in such a manner that upon absorption of the irradiated laser beam energy, such a portion of the recording layer undergoes a thermal deformation such as decomposition, evaporation or dissolution. Further, the reproduction of the recording information is conducted by reading the difference in reflectance between the portion where a deformation was formed by the laser beam and a portion where no such deformation was formed.

Accordingly, the recording layer is required to efficiently absorb the laser beam energy, and a laser-absorbing dye is employed.

Various constructions have been known for optical recording media of this type. For example, Japanese Unexamined Patent Publication No. 97033/1980 discloses a medium having a single layer of phthalocyanine type dye provided on a substrate. However, the phthalocyanine type dye has a problem that the sensitivity is low, and the decomposition point is high and vapor deposition is difficult. Further, it has an additional problem such that the solubility in an organic solvent is very poor, whereby it can not be used for coating in the form of a coating solution.

On the other hand, Japanese Unexamined Patent Publications No. 112790/1983, No. 114989/1983, No. 85791/1984 and No. 83236/1985 disclose media having cyanine-type dyes as the respective recording layers. Such dyes have high solubility and thus have a merit that coating in the form of a coating solution is possible. However, they also have a problem that they are inferior in the light resistance. In this connection, Japanese Unexamined Patent Publication No. 55795/1984 proposes to improve the light resistance by an addition of a quencher to such a cyanine type dye. However, such a proposal is still at an inadequate level.

In connection with such problems, Japanese Unexamined Patent Publication No. 30090/1987 discloses a recording medium wherein a complex of a monoazo compound with a metal, is employed, as a recording medium having the solubility in an organic solvent and the light resistance improved. However, such a compound is inferior in the sensitivity with the light sensitive wavelength being short, and further it is inferior in the storage stability at a high temperature high humidity condition, whereby it has problems as an optical recording medium.

DISCLOSURE OF THE INVENTION

The present invention relates to a metal chelate compound of a dis-azo compound represented by the following formula (I) with a metal:

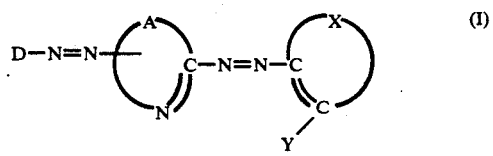

(wherein A is a residue forming a heterocyclic ring together with the carbon atom and the nitrogen atom to which it is bonded, X is a residue forming an aromatic group together with the two carbon atoms to which it is bonded, D is an aromatic residue which may have a substituent, or a heterocyclic amine residue which may have a substituent, and Y is a group having active hydrogen), and an optical recording medium employing such a metal chelate compound.

Now, the present invention will be described in detail.

In the formula (I), A is a residue forming a heterocyclic ring together with the carbon atom and the nitrogen atom to which it is bonded, and

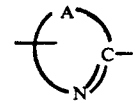

includes, for example, the following:

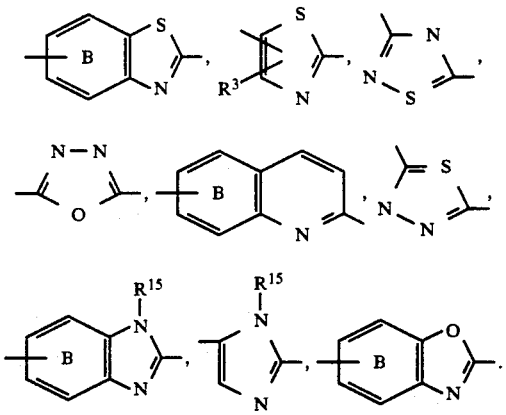

In the above formulas, ring B may be substituted by a $C_{1-6}$ alkyl group such as a methyl group, an ethyl group, a n-propyl group, an isopropyl group, a n-butyl group, a tert-butyl group, a sec-butyl group, a n-pentyl group, or a n-hexyl group; a $C_{1-6}$ alkoxy group such as a methoxy group, an ethoxy group, a n-propoxy group, an isopropoxy group, a n-butoxy group, a tert-butoxy group, a sec-butoxy group, a n-pentyloxy group, or a n-hexyloxy group; or a halogen atom such as a fluorine atom, a chlorine atom, or a bromine atom, $R^3$ is a hydrogen atom; a $C_{1-6}$ alkyl group such as a methyl group, an ethyl group, a n-propyl group, an isopropyl group, a n-butyl group, a tert-butyl group, a sec-butyl group, a n-pentyl group, or n-hexyl group; a $C_{1-6}$ alkoxy group such as a methoxy group, an ethoxy group, a n propoxy group, an isopropoxy group, a n butoxy group, a tert-butoxy group, a sec-butoxy group, a n-pentyloxy group, or a n-hexyloxy group; a halogen atom such as a fluorine atom, a chlorine atom, or a bromine atom; or a $C_{6-12}$ aryl group such as a phenyl group, a tolyl group, a xylyl group, or a naphthyl group, and $R^{15}$ is a $C_{1-6}$ alkyl group such as a methyl group, an ethyl group, a n-propyl group, an isopropyl group, a n-butyl group, a tert-butyl group, a sec-butyl group, a n-pentyl group, or a n-hexyl group.

In the formula (I), X is a residue forming an aromatic ring such as a benzene ring or a naphthalene ring together with the two carbon atoms to which it is bonded. Further, X may have at least one substituted selected from the group consisting of —$NR^1R^2$ (wherein each of $R^1$ and $R^2$ which are independent from each other, is a hydrogen atom; a $C_{1-20}$ alkyl group such as a methyl group, an ethyl group, a n-propyl group, an isopropyl group, a n-butyl group, a tert-butyl group, a sec-butyl group, a n pentyl group, a n-hexyl group, a n-heptyl group, a n-octyl group, a n-decyl group, n-dodecyl group, or a n-octadecyl group; a $C_{6-12}$ aryl group such as a phenyl group, a tolyl group, a xylyl group, or a naphthyl group; a $C_{2-10}$ alkenyl group such as a vinyl group, a 1-propenyl group, a allyl group, an isopropenyl group, a 1-butenyl group, a 1,3-butadienyl group, or a 2-pentenyl group; or a $C_{3-10}$ cycloalkyl group such as a cyclopropyl group, a cyclobutyl group, a cyclopentyl group, a cyclohexyl group, a cycloheptyl group, a cycloheptyl group, or a cyclooctyl group, such a $C_{1-20}$ alkyl group, a $C_{6-12}$ aryl group, a $C_{2-10}$ alkenyl group and a $C_{3-10}$ cycloalkyl group may be substituted by e.g. a $C_{1-10}$ alkoxy group such as a methoxy group, an ethoxy group, a n-propoxy group, an isopropoxy group, a n-butoxy group, a tert-butoxy group, a sec-butoxy group, a n-pentyloxy group, a n-hexyloxy group, a n-heptyloxy group, a n-octyloxy group, or a n-decyloxy group; a $C_{2-12}$ alkoxyalkoxy group such as methoxymethoxy group, an ethoxymethoxy group, a propoxymethoxy group, a methoxyethoxy group, an ethoxyethoxy group, a propoxyethoxy group, a methoxypropoxy group, an ethoxypropoxy group, a mothoxybutoxy group, or an ethoxybutoxyl group; a $C_{3-15}$ alkoxyalkoxyalkoxy group such as a methoxymethoxymethoxy group, a methoxymethoxyethoxy group, a methoxyethoxymethoxy group, a methoxyethoxyethoxy group, an ethoxymethoxymethoxy group, an ethoxymethoxyethoxy group, an ethoxyethoxymethoxy group, or ethoxyethoxyethoxy group; an allyoxy group; a $C_{6-12}$ aryl group such as a phenyl group, a polyl group, a xylyl group, or a naphthyl group; a $C_{6-12}$ aryloxy group such as a phenoxy group, a tolyloxy group, a xylyloxy group, or a naphthyloxy group; a cyano group; a nitro group; a hydroxyl group; a tetrahydrofuryl group; a $C_{1-6}$ alkylsulfonylamino group such as a methylsulfonylamino group, an ethylsulfonylamino group, a n-propylsulfonylamino group, an isopropylsulfonylamino group, a n-butylsulfonylamino group, a tert-butylsulfonylamino group, a sec-butylsulfonylamino group, a n-pentylsulfonylamino group, or a n-hexylsulfonylamino group; a halogen atom such as a fluorine atom, a chlorine atom, or a bromine atom; a $C_{2-7}$ alkoxycarbonyl group such as a methoxycarbonyl group, an ethoxycarbonyl group, a n-propoxycarbonyl group, an isopropoxycarbonyl group, a n-butoxycarbonyl group, a tert-butoxycarbonyl group, a sec-butoxycarbonyl group, a n-pentyloxycarbonyl group, or a n-hexyloxycarbonyl group; a $C_{2-7}$ alkylcarbonyloxy group such as a methylcarbonyloxy group, an ethylcarbonyloxy group, a n-propylcarbonyloxy group, an isopropylcarbonyloxy group, a n-butylcarbonyloxy group, a tert-butylcarbonyloxy group, a sec-butylcarbonyloxy group, a n-pentylcarbonyloxy group, or a n-hexylcarbonyloxy group; or a $C_{2-7}$ alkoxycarbonyloxy group such as a methoxycarbonyloxy group, an ethoxycarbonyloxy group, a n-propoxycarbonyloxy group, an isopropoxycarbonyloxy group, a n-butoxycarbonyloxyl group, a tert-butoxycarbonyloxy group, a sec-butoxycarbonyloxy group, a n-pentyloxycarbonyloxy group, or a n-hexyloxycarbonyloxy group, further the $C_{6-12}$ aryl group and the $C_{3-10}$ cycloalkyl group represented by $R^1$ and $R^2$ may be substituted by a $C_{1-6}$ alkyl group such as a methyl group, an ethyl group, an n-propyl group, an isopropyl group, a n-butyl group, a tert-butyl group, a sec-butyl group, a n-pentyl group, or a n-hexyl group); a $C_{1-6}$ alkyl group such as a methyl group, an ethyl group, a n-propyl group, an isopropyl group, a n-butyl group, a tert-butyl group, a sec-butyl group, a n-pentyl group, or a n-hexyl group; a $C_{1-6}$ alkoxy group such as a methoxy group, an ethoxy group, a n-propoxy group, an isopropoxy group, a n-butoxy group, a tert-butoxy group, a sec-butoxy group, a n-hexyloxy group; and a halogen atom such as a fluorine atom, a chlorine atom, or a bromine atom.

In the formula (I), D may be an aromatic or heterocyclic amine residue which may be substituted, such as:

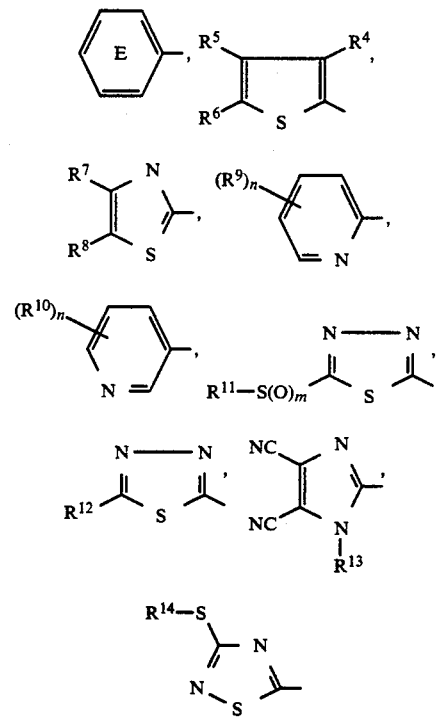

In the above formulas, the substituent on ring E, or each of substituents $R^4$, $R^5$, $R^6$, $R^7$, $R^8$, $R^9$ and $R^{10}$, may be a $C_{1-20}$ alkyl group such as a methyl group, an ethyl group, a n-propyl group, an isopropyl group, a n-butyl group, a tert-butyl group, a sec-butyl group, a n-pentyl group, a n-hexyl group, a n-heptyl group, a n-octyl group, a n-decyl group, a n-dodecyl group, or a n-octadecyl group; a $C_{3-10}$ cycloalkyl group such as a cyclopropyl group, a cyclobutyl group, a cyclopentyl group, a cyclohexyl group, a cycloheptyl group, or a cyclobutyl group, which may be substituted by such a $C_{1-20}$ alkyl group; a $C_{1-20}$ alkoxy group such as a methoxy group, an ethoxyl group, a n-propoxy group, an isopropoxy group, a n-butoxy group, a tert-butoxy group, a sec-butoxy group, a n-pentyloxy group, a n-hexyloxy group, a n-heptyloxy group, a n-octyloxy group, a n-decyloxy group, a n-dodecyloxy group, or a n-octadecyloxy group; a nitro group; a cyano group; —$COOR^{17}$ (wherein $R^{17}$ is the above-mentioned $C_{1-20}$ alkyl group; the above-mentioned $C_{3-10}$ cycloalkyl group which may have a $C_{1-20}$ alkyl group; or a phenyl group which may have at least one substituent selected from the group consisting of the above mentioned $C_{1-20}$ alkyl group, the above mentioned $C_{3-10}$ cycloalkyl group which may be substituted by a $C_{1-20}$ alkyl group, and the above mentioned $C_{1-20}$ alkoxy group); a phenyl group which may be substituted by the above-mentioned $C_{1-20}$ alkyl group or the above mentioned $C_{1-20}$ alkoxy group; a $C_{1-20}$ alkylsulfonyl group such as a methylsulfonyl group, an ethylsulfonyl group, a n-propylsulfonyl group, an isopropylsulfonyl group, a n-butylsulfonyl group, a tert-butylsulfonyl group, a sec-butylsulfonyl group, a n-pentylsulfonyl group, a n-hexylsulfonyl group, a n-heptylsulfonyl group, a n-octylsulfonyl group, or a n-decylsulfonyl group; a halogen atom such as a fluorine atom, a chlorine atom, or a bromine atom; or a $C_{1-3}$ perfluoroalkyl group such as a trifluoromethyl group. n is 1 or 2. Each of Substituents $R^{11}$, $R^{12}$, $R^{13}$ and $R^{14}$, may be an allyl group; a $C_{1-8}$ alkyl group such as a methyl group, an ethyl group, a n-propyl group, an isopropyl group, a n-butyl group, a tert-butyl group, a sec-butyl group, a n-pentyl group, a n-hexyl group, a n-heptyl group, or a n-octyl group; a $C_{3-8}$ alkoxyalkyl group such as a methoxyethyl group, a methoxypropyl group, a methoxybutyl group, an ethoxymethyl group, an ethoxyethyl group, an ethoxypropyl group, an ethoxybutyl group, a propoxymethyl group, a propoxyethyl group, a propoxypropyl group, a propoxybutyl group, a butoxymethyl group, or a butoxyethyl group; a $C_{7-13}$ aralkyl group such as a benzyl group, a phenetyl group, a phenylpropyl group, or a naphthylmethyl group; a $C_{1-10}$ hydroxyalkyl group such as a hydroxymethyl group, a hydroxyethyl group, a hydroxypropyl group, a hydroxybutyl group, a hydroxypentyl group, or a hydroxyhexyl group; or a $C_{1-13}$ perfluoroalkyl group such as a trifluoromethyl group, and m is 0, 1 or 2.

In the formula (I), Y may be a group having active hydrogen, such as —OH, —SH, —COOH, —$SO_2H$, —$SO_3H$, —$NH_2$, —$NHR^{16}$, —$B(OH)_2$, —$PO(OH)_2$, —$NHCOR^{16}$, —$NHSO_2R^{16}$.

In the above formulas $R^{16}$ is a $C_{1-6}$ alkyl group such as a methyl group, an ethyl group, a n-propyl group, an isopropyl group, a n-butyl group, a tert-butyl group, a sec-butyl group, a n-pentyl group, or a n-hexyl group; a $C_{1-6}$ alkoxy group such as a methoxy group, an ethoxy group, a n propoxy group, an isopropoxy group, a n-butoxy group, a tert-butoxy group, a sec-butoxy group, a n-pentyloxy group, or a n-hexyloxy group; a phenyl group which may be substituted by a halogen atom such as a fluorine atom, a chlorine atom or a bromine atom; or a $C_{1-6}$ alkyl group such as a methyl group, an ethyl group, a n-propyl group, an isopropyl group, a n-butyl group, a tert-butyl group, a sec-butyl group, a n-pentyl group, or a n-hexyl group, which may be substituted by a halogen atom such as a fluorine atom, a chlorine atom, or a bromine atom.

In a case where Y is an anion-dissociable group such as —OH, —COOH, —$SO_3H$, such a compound may be used in that form or in the form of a salt with a cation, for the formation of a metal chelate compound. As such a cation, an inorganic cation such as Na+, Li+, or K+, or an organic cation such as

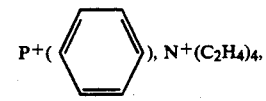

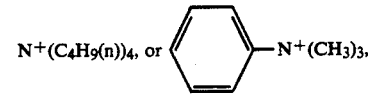

may be mentioned.

As one embodiment of a compound preferred in the present invention, a metal chelate compound of a dis-azo compound represented by the following formula (II):

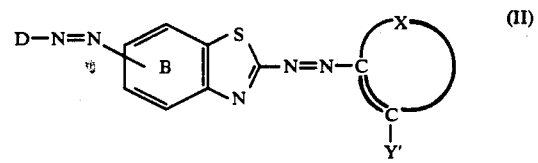

(wherein D and X are as defined above, ring B may have a substituent, and Y' is —COOH, or —$SO_3H$), with a metal, may be mentioned.

The substituent on ring B in the above formula (II), may, for example, be the above-mentioned $C_{1-20}$ alkyl group, the above-mentioned $C_{1-20}$ alkoxy group, or the above mentioned halogen atom.

Among the compounds represented by the above formula (II), preferred is a metal chelate compound of a dis-azo compound represented by the following formula (III):

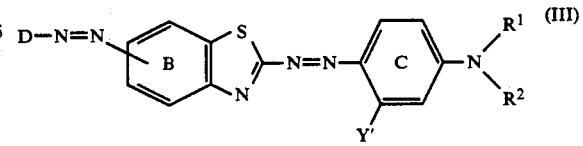

(wherein D, B, Y', $R^1$ and $R^2$ are as defined above, and ring C may have a substituent), with a metal, and more preferred is a metal chelate compound of a dis-azo compound represented by the following formula (IV):

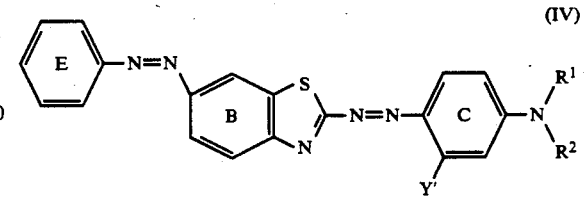

(wherein B, C, E, Y', $R^1$ and $R^2$ are as defined above), with a metal.

The substituent on ring C may be the same substituent as the one on ring B.

Further, another embodiment of a compound preferred in the present invention is a metal chelate compound of a dis-azo compound represented by the following formula (V):

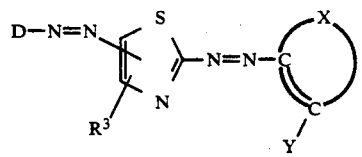

(wherein D, X, Y and R³ are as defined above), with a metal.

Among the compounds represented by the above formula (V), preferred is a metal chelate compound of a dis-azo compound represented by the following formula (VI):

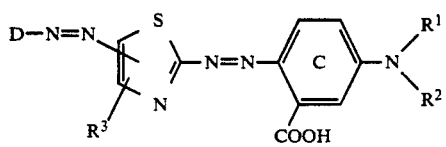

(wherein D, C, R¹, R² and R³ are as defined above), with a metal, and more preferred is a metal chelate compound of a dis-azo compound represented by the following formula (VII):

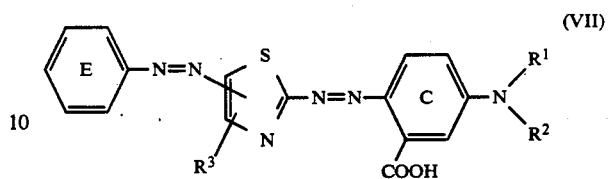

(wherein C, E, R¹, R² and R³ are as defined above), with a metal.

In the present invention, the metal to form a chelate with the dis-azo compound is not particularly limited so long as it is a metal capable of forming a metal chelate compound with the dis-azo compound concerned. However, a transition element such as Ni Co, Fe, Ru, Rh, Pd, Os, Ir, or Pt, is preferred. Particularly preferred is Ni or Co.

In the present invention, specific examples of the dis-azo compound to form a chelate with a metal, include the following:

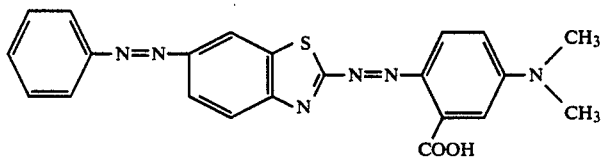

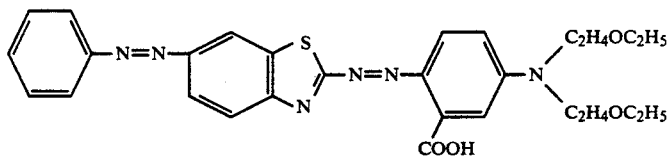

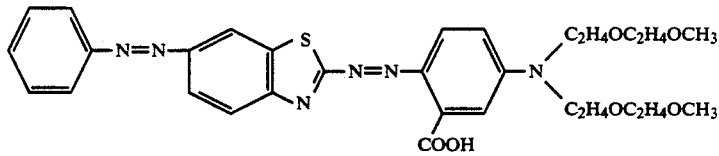

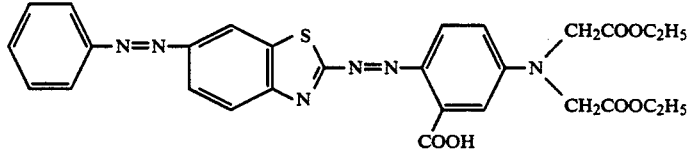

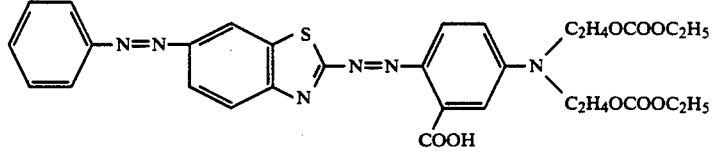

-continued
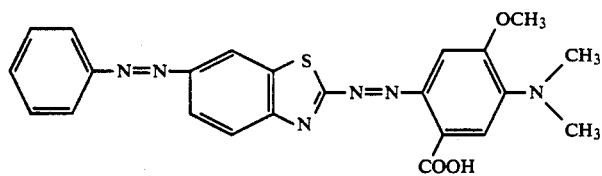
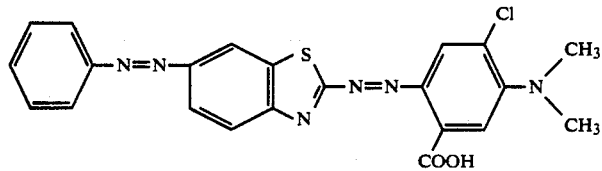
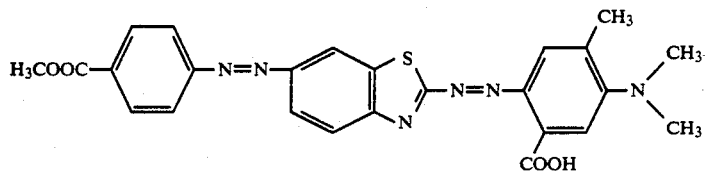
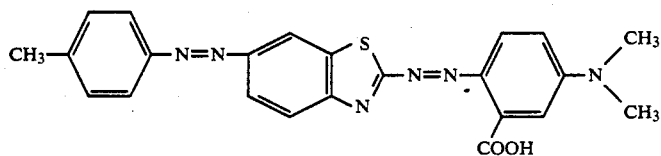
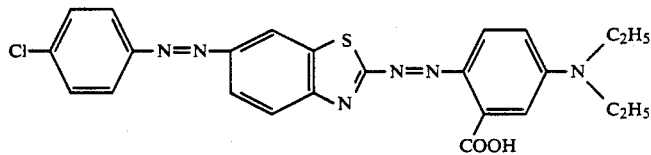
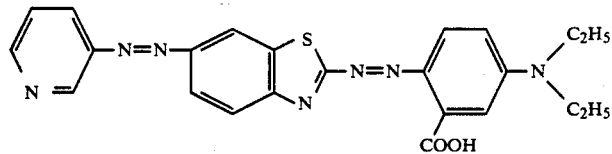
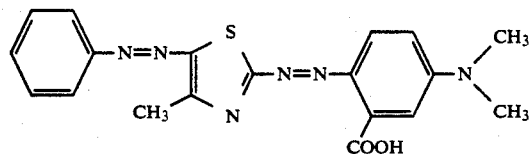
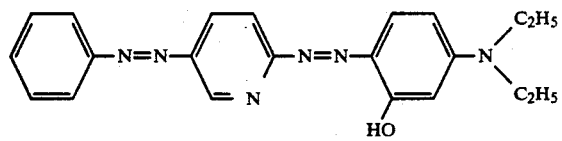
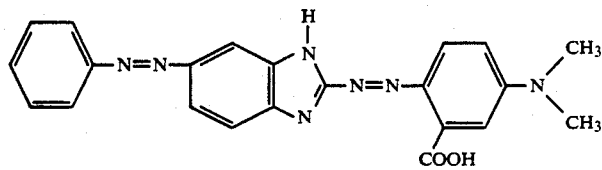

-continued
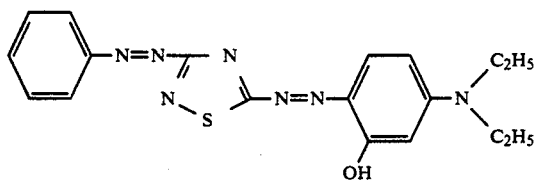
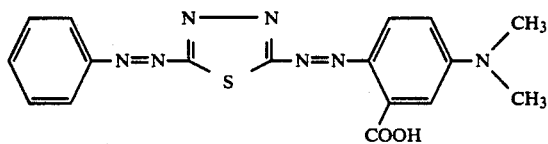
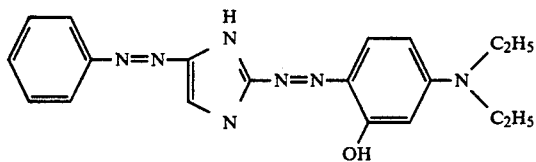
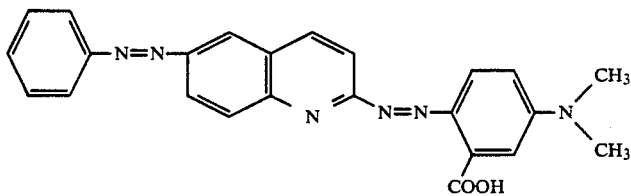
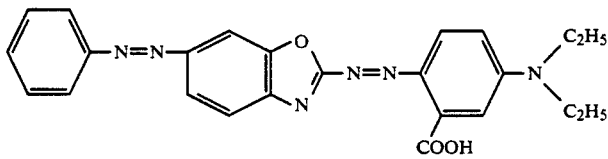
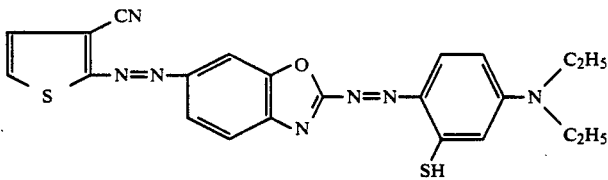
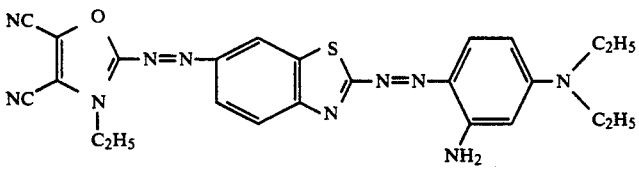
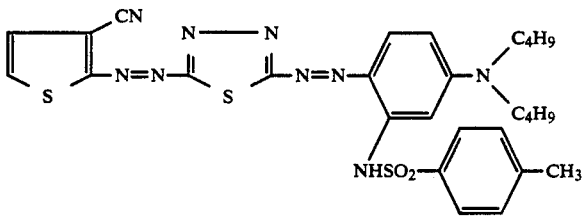
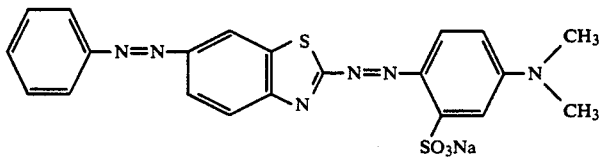

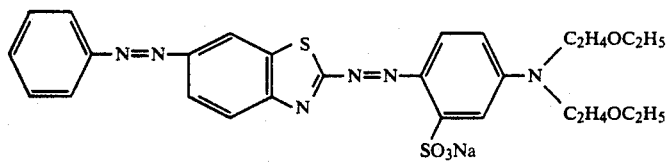
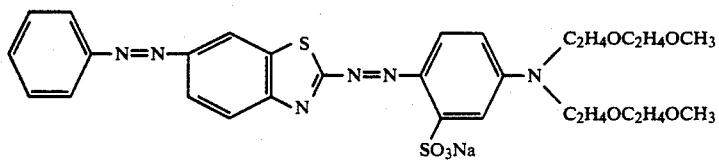
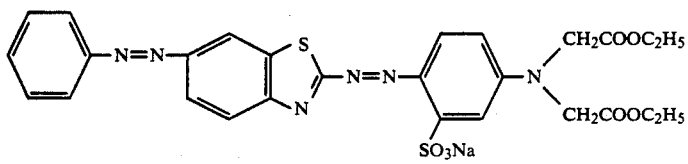
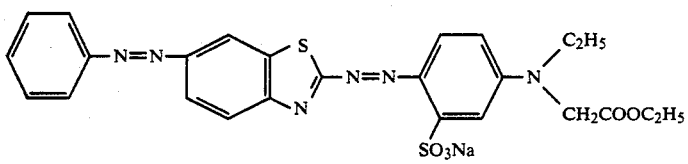
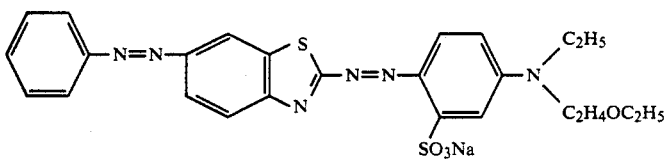
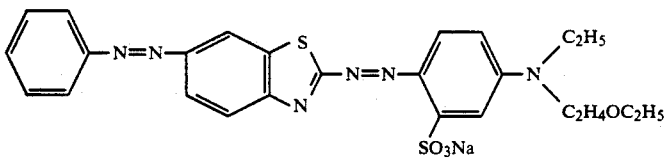
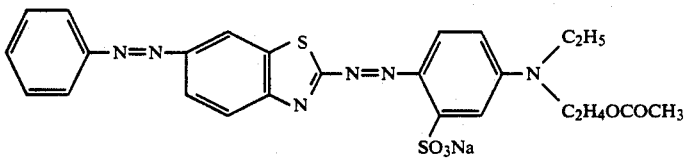
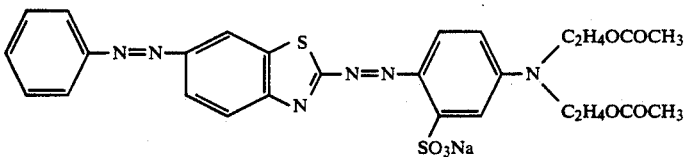
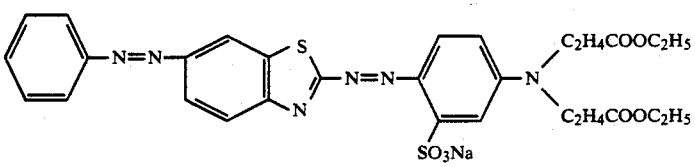

-continued
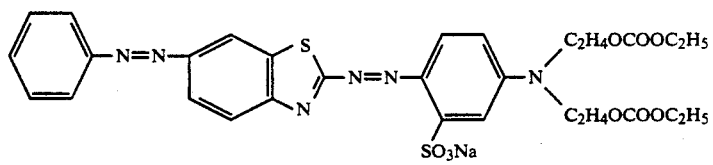
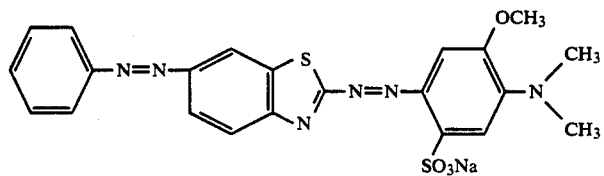
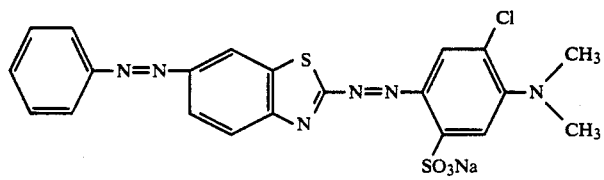
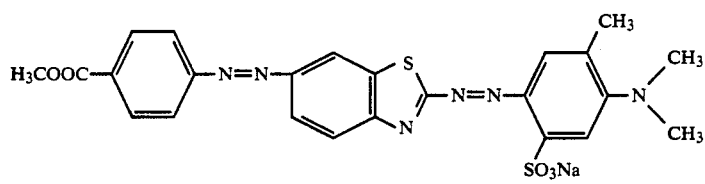
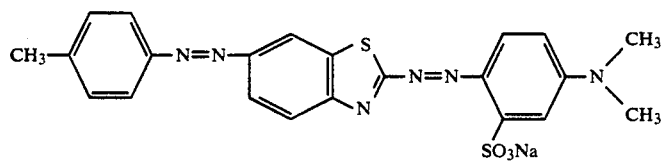
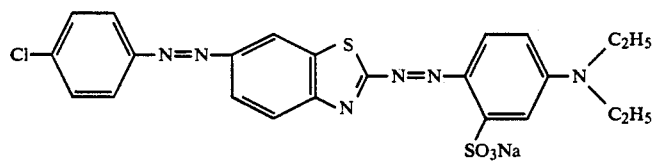
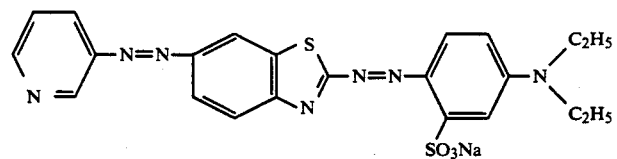
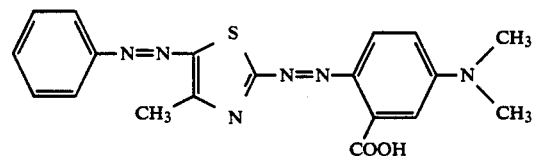
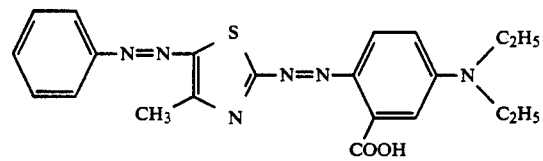

-continued
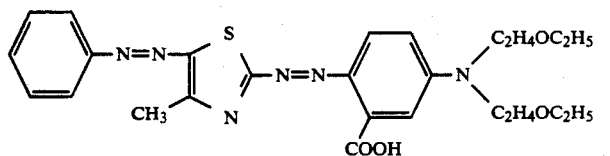
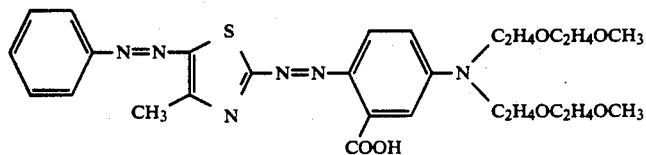
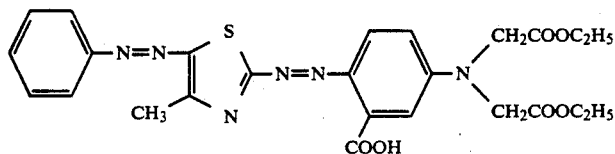
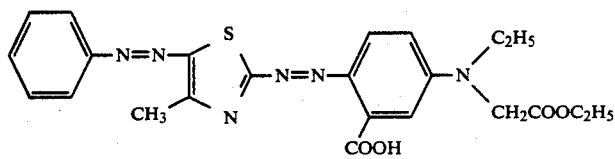
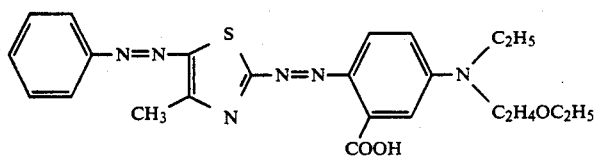
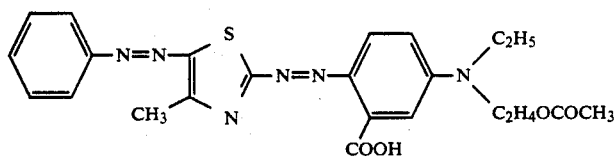
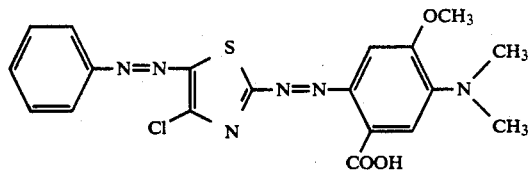
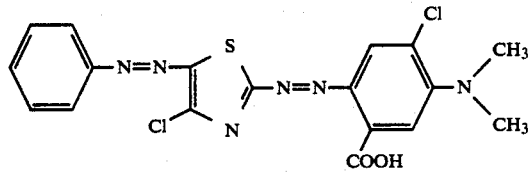
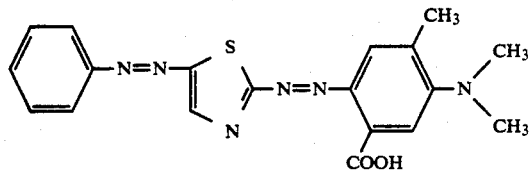

-continued

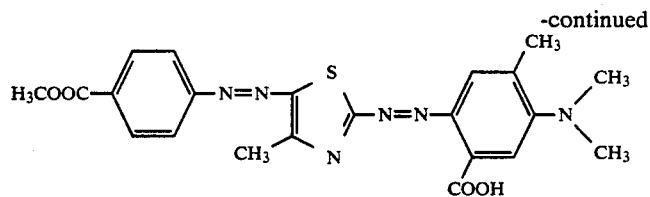

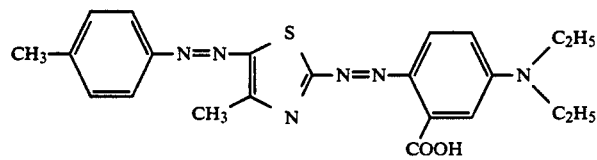

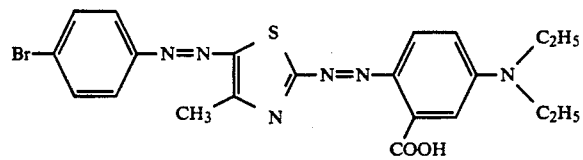

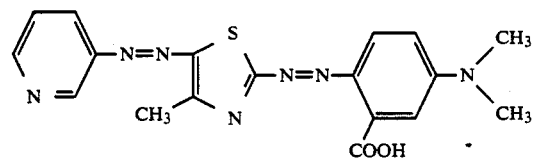

Now, a method for producing the metal chelate compound of a dis-azo compound of the present invention will be described.

The metal chelate compound of a dis-azo compound of the present invention may be prepared, for example, in accordance with the disclosure by Furukawa in Analytica Chimica Acta 140 (1982) 281-289. Namely, an amino compound represented by the formula (VIII) or the formula (IX):

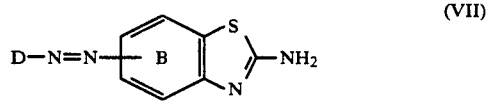 (VII)

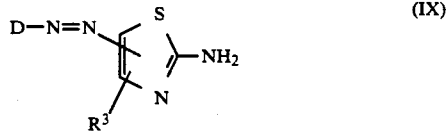 (IX)

(wherein D, ring B and $R^3$ are as defined above) is diazotized in accordance with a conventional method, followed by coupling with a substituted aniline derivative represented by the following formula (X):

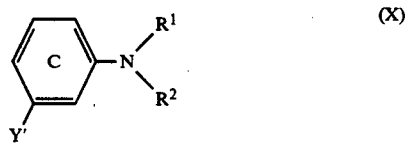 (X)

(wherein C, Y', $R^1$ and $R^2$ are as defined above) to obtain a dis-azo compound of the above formula (III) or (VI). Then, the above dis-azo compound and a metal salt are reacted in water and/or an organic solvent such as a dioxane, tetrahydrofuran, acetone or ethanol to produce a metal chelate compound of the present invention.

As the anion of the metal salt to be used for the preparation of the metal chelate compound, a monovalent or bivalent anion such as $SCN^-$, $SbF_6^-$, $Cl^-$, $Br^-$, $F^-$, $ClO_4^-$, $BF_4^-$, $PF_6^-$, $CH_3COO^-$, $TiF_6^{2-}$, $SiF_6^{2-}$, $ZrF_6^{2-}$,

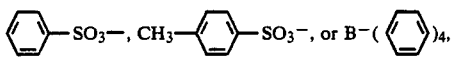

is preferred. Particularly preferred is $BR_4^-$, $PF_6^-$, or $CO_3COO^-$.

Now, the optical recording medium of the present invention will be described.

The optical recording medium of the present invention consists essentially of a substrate and a recording layer containing the above metal chelate compound of a dis-azo compound. However, if necessary, an undercoating layer may be provided on the substrate. Further, as a preferred layer structure, a metal reflective layer of e.g. gold or aluminum, and a protective layer may be formed on the recording layer to obtain a medium having a high reflectance and to obtain a writable CD medium.

The substrate in the present invention may be transparent or opaque to the laser beam to be used. As the material for the substrate, a usual support for the recording material such as glass, plastic, paper, or a platelike or foil-like metal, may be mentioned. However, plastics are preferably used from various reasons. Such plastics include, for example, acryl resin, methacryl resin, vinylacetate resin, vinyl chloride resin, nitrocellulose, polyethylene resin, polypropylene resin, polycarbonate resin, polyimide resin, epoxy resin, and polysulfone resin. However, from the viewpoint of the productivity, cost and moisture resistance, a polycarbonate resin substrate of injection molding type is used particularly preferably.

The recording layer containing the chelate compound of the dis-azo compound with a metal in the optical medium of the present invention, preferably has a thickness of from 100 Å to 5 μm, more preferably from 1,000 Å to 3 μm. With respect to the layer-forming method, a layer may be formed by a conventional thin layer-forming method such as a vacuum deposition method, a sputtering method, a doctor blade method, a casting method, a spinning method or a dipping method. The spinning method is preferred from the viewpoint of the mass productivity and the cost.

Further, a binder may be used as the case requires. As the binder, a conventional binder such as polyvinyl alcohol, polyvinylpyrrolidone, ketone resin, nitrocellulose, cellulose acetate, polyvinylbutyral, or polycarbonate, may be employed. In the case of layer-forming by a spinning method, the rotational speed is preferably from 500 to 5,000 rpm. After the spin coating, treatment such as heating or application of a solvent vapor may be conducted as the case requires.

For improvement of the stability and the light resistance of the recording layer, a transition metal chelate compound (such as acetylacetonate chelate, bisphenyldithiol, salithylaldehydeoxime or a bisdithio-α-diketone) may be incorporated as a singlet state oxygen quencher. Furthermore, a homologous dye, or a dye in a different category, such as a triallylmethane type dye, an azo dye, a cyanine type dye, a squallilium type dye, a metal chelate compound of a monoazo compound, or a nickel-indoaniline type dye, may be used in combination.

In a case of forming a recording layer by a doctor blade method, a casting method, a spinning method or a dipping method, particularly by a coating method such as a spinning method, as the coating solvent, a solvent having a boiling pint of from 120 to 160° C., such as tetrafluoropropanol, octafluoropentanol, tetrachloroethane, bromoform, dibromoethane, diacetone alcohol, ethylcellosolve, xylene, 3-hydro-3-methyl-2-butanone, chlorobenzene, cyclohexanone, or methyl lactate, may suitable by used.

Among them, a ketone alcohol type solvent such as diacetone alcohol, or 3-hydroxy-3-methyl-2-butanone; a cellosolve type solvent such as methylcellosolve, or ethylcellosolve; a perfluoroalkyl alcohol type solvent such as tetrafluoropropanol, or octafluoropentanol; or a hydroxyester type solvent such as methyl lactate, or methyl isobutyrate, may be mentioned as a solvent particularly useful for an injection type polycarbonate resin substrate which is excellent in the productivity, cost and moisture resistance, without damaging the substrate.

The recording layer of the optical recording medium of the present invention may be provided on each side of the substrate or may be provided on one side only.

Recording on the recording medium thus obtained, is conducted by irradiating a laser beam, preferably a semiconductor laser beam, focused to a size of 1 μm on the recording layer provided on each side or one side of the substrate. At the portion irradiated with the laser beam, a thermal deformation of the recording layer, such as decomposition, evaporation or melting, takes place due to absorption of the laser energy. Accordingly, reproduction of the recorded information can be conducted by reading the difference in reflectance between the portion where a thermal deformation has taken place by the laser beam and the portion where no such deformation has taken place.

As the laser beam to be used for recording and reproduction of the optical recording medium of the present invention, a N₂, He-Cd, Ar, He-Ne, rubie, semiconductor or dye laser may be mentioned. However, from the viewpoint of the light weight, easy handing and compactness, a semiconductor laser is preferably employed.

BRIEF DESCRIPTION OF DRAWINGS

FIG. 5 is a drawing showing a visible range absorption spectrum of the nickel chelate compound obtained in Example 4.

BEST MODE FOR CARRYING OUT THE INVENTION

Now, the present invention will be described in more detail with reference to Examples. However, such Examples by no means restrict the present invention.

EXAMPLE 1

(a) Preparation of a Compound 2.5 g of 2-amino-6-phenylbenzothiazole represented by the following structural formula:

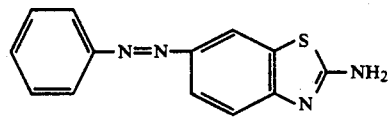

was dissolved in a mixture solution comprising 15 ml of phospholic acid, 15 ml of acetic acid and 5 ml of propionic acid and diazotized at from 0 to −3° C. by means of 3.4 g of 45% nitrosylsulfuric acid.

To a solution having 1.65 g of 3-dimethylaminobenzoic acid dissolved in 100 ml of methanol, the diazotized solution thus obtained was dropwise added at a temperature of from 0 to 5° C., followed by neutralization by means of an alkali compound such as sodium acetate or aqueous ammonia. Obtained crystals were collected by filtration and dried to obtain 2.5 g of brown crystals represented by the following structural formula. The maximum absorption wavelength (in chloroform) of this compound was 595 nm.

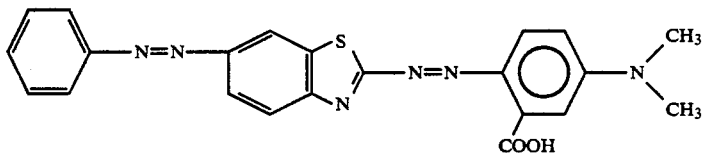

Figure 1:
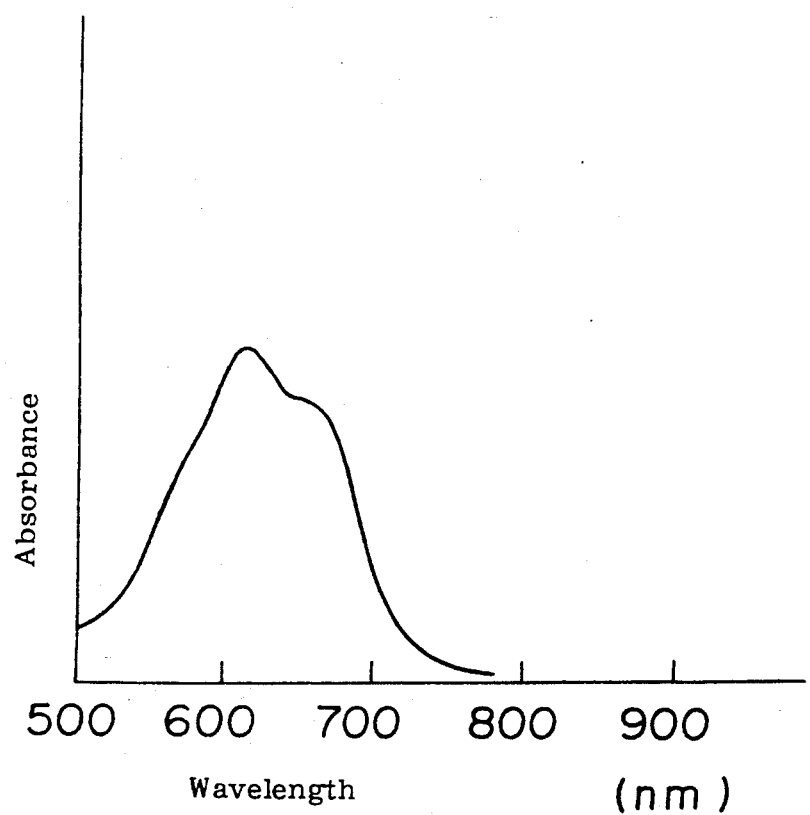
FIG. 1 is a drawing showing a visible range absorption spectrum of the nickel chelate compound of Example 1, wherein the ordinate represents absorbance, and the abscissa represents wavelength (nm).

0.8 g of the dis-azo compound thus obtained was dissolved in 50 ml of tetrahydrofuran, and 2.6 g of 40% nickel borofluoride was added, followed by filtration. The filtrate was poured into a solution having 50 g of sodium borofluoride dissolved in 50 ml of water, and excess water was further added to precipitate crystals. Obtained crystals were collected by filtration and dried to obtain 0.5 g of a nickel chelate compound as black crystals. The maximum absorption wavelength (in chloroform) of this compound was 655 nm (see FIG. 1).

Figure 2:
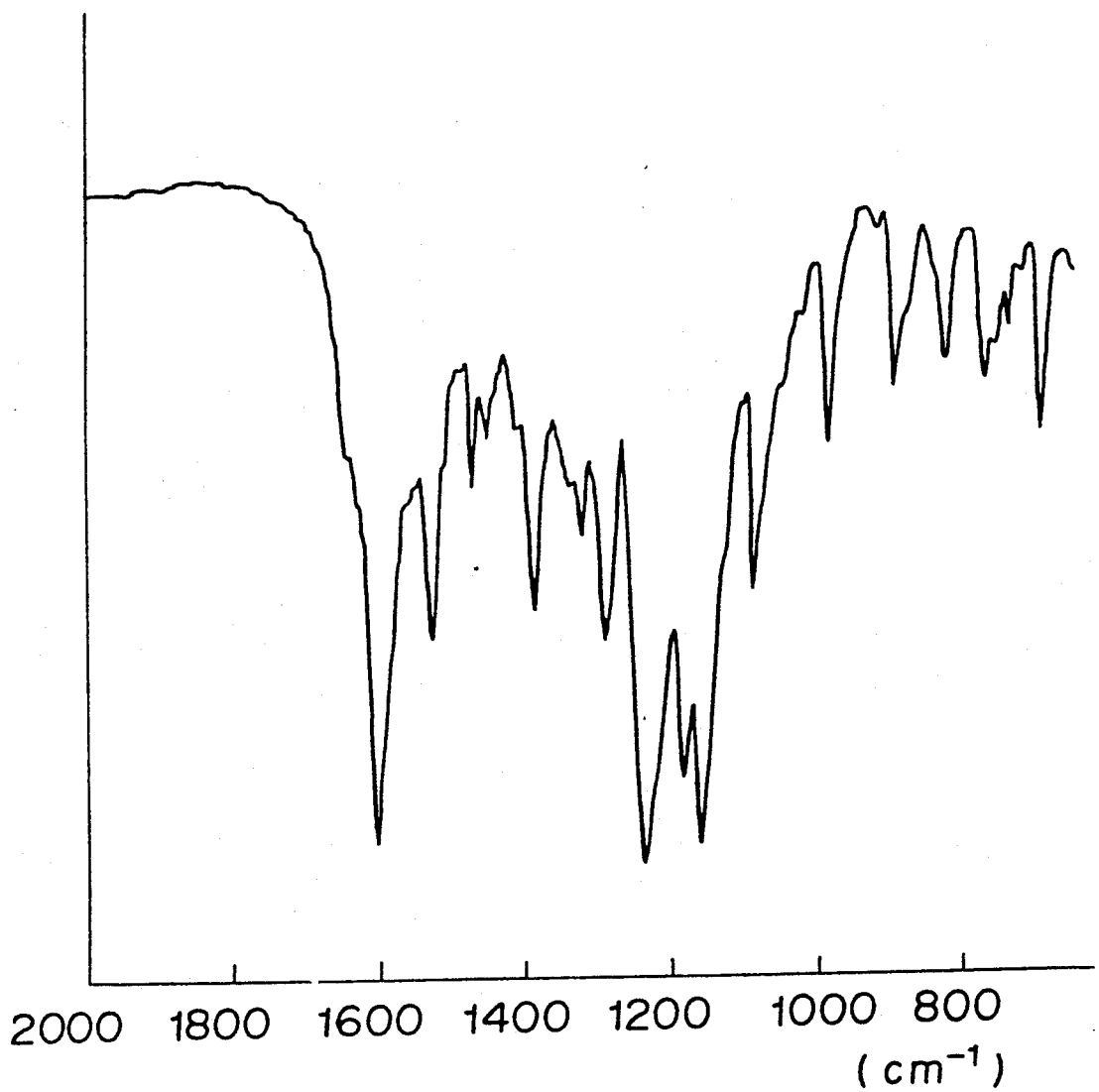
FIG. 2 is a drawing showing an infrared absorption spectrum of the nickel chelate compound of Example 1.

Further, the infrared absorption spectrum of this compound is shown in FIG. 2.

Physical properties
Melting point: at least 250° C.
$\lambda max = 655$ nm (in chloroform)
$\epsilon = 12.1 \times 10^4$ (b) Preparation of an Optical Recording Medium 0.15 g of the chelate compound of a dis-azo compound with nickel, obtained in the above Preparation Example (a) was dissolved in 7.5 g of octafluoropentanol and filtered through a filter of 0.22 μm to obtain a solution. 5 ml of this solution was dropped on a injection molded polycarbonate resin substrate having a diameter of 5 inch and provided with groove having a depth of 700 Å and a width of 0.7 μm and coated by a spinning method at a rotational speed of 500 rpm. After the coating, the coating layer was dried at 60° C. for 10 minutes. The maximum absorption wavelengths of the coating layer were 635 nm and 691 nm.

Figure 3:
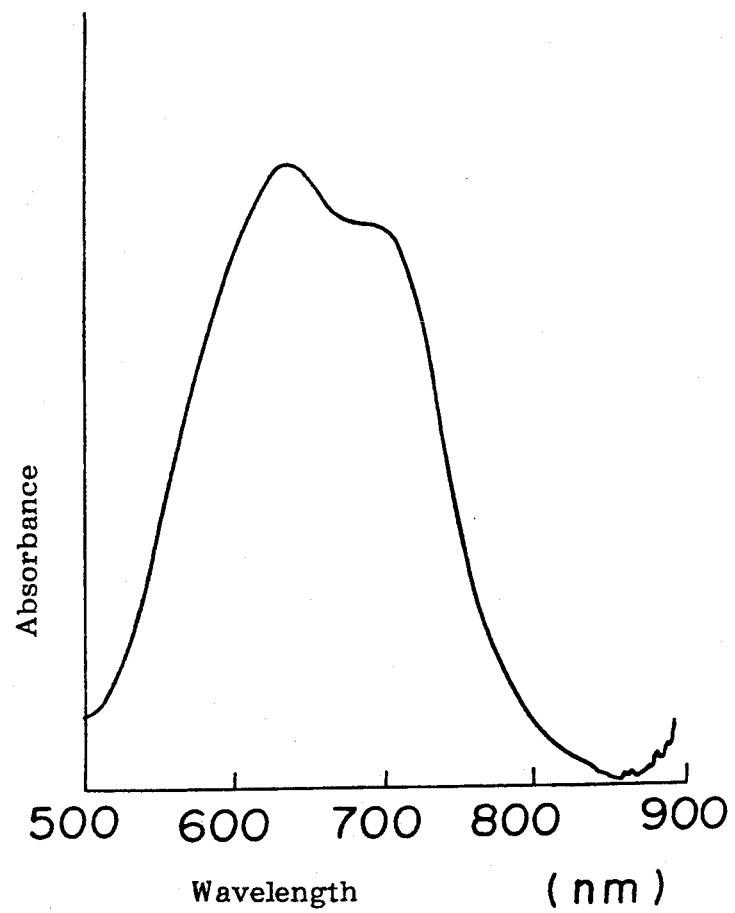
FIG. 3 is a drawing showing an absorption spectrum of the coating layer of Example 1, wherein the ordinate represents absorbance, and the abscissa represents wavelength (nm).

FIG. 3 shows the absorption spectrum of the coating layer.

Then, on the coating layer, a film of gold was formed in a thickness of 2,000 Å by a sputtering method to form a reflective layer. Further, on this reflective layer, an ultraviolet-curable resin was spin-coated and then cured by irradiation with ultraviolet rays to form a protective layer having a thickness of 10 μm to obtain an optical recording medium.

(c) Optical Recording

While rotating the above recording medium at a speed of 1.2 m/s, a semiconductor laser beam having a center wavelength of 780 nm was irradiated with a recording power of 7.0 mW to record EFM signals. Then, this recorded portion was reproduced by a CD layer with a semiconductor laser having a center wavelength of 780 nm, whereby excellent reproduction signals were obtained.

Further, tests for light resistance (Xenone Fade Meter Accelerated Test; 60 hours) and storage stability (70° C, 85% RH; 500 hours) were conducted, whereby no deterioration in the sensitivity and reproduction signals was observed as compared with the initial values, and the medium was found to be excellent as an optical recording medium.

COMPARATIVE EXAMPLE 1

An optical recording medium was prepared in the same manner as in Example 1 except that a nickel complex obtained from a monoazo compound represented by the following structural formula:

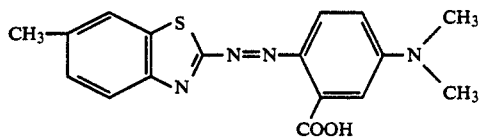

and nickel borofluoride, was employed.

The sensitivity and the storage stability were evaluated and compared, whereby both the sensitivity and the storage stability were inferior as compared with the optical recording medium of Example 1 of the present invention.

EXAMPLE 2

Figure 4:
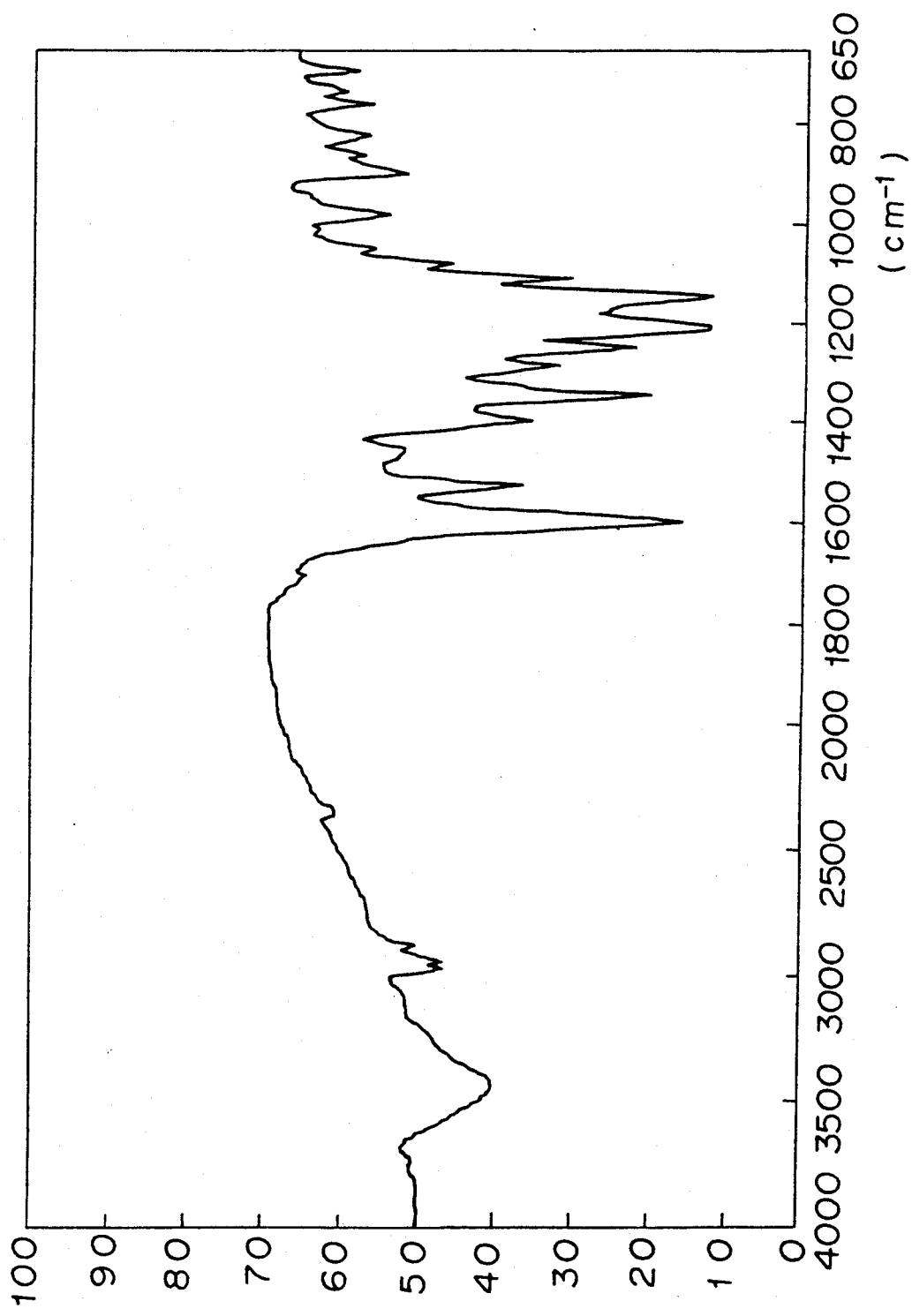
FIG. 4 is a drawing showing an infrared absorption spectrum of the nickel chelate compound obtained in Example 2.

(a) Preparation of a Compound 0.3 g of a dis-azo compound represented by the following structural formula:

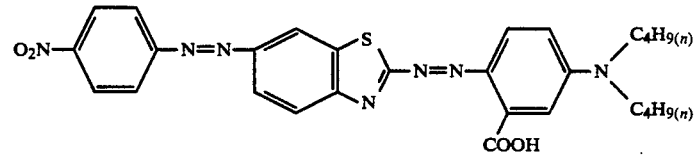

was dissolved in a mixture solution comprising 30 ml of tetrahydrofuran and 30 ml of water, and 0.080 g of nickel acetate was added thereto, followed by stirring at room temperature. After adding excess water, precipitated crystals were collected by filtration, washed with methanol and toluene and dried to obtain 0.148 g of a nickel chelate compound as brown crystals. The maximum absorption wavelength (in chloroform) of this product was 673 nm. Further, the infrared absorption spectrum of this compound is shown in FIG. 4.

Physical properties
Melting point: at least 250° C.
λmax=673 nm (in chloroform)
$\epsilon = 9.7 \times 10^4$ (b) Preparation of an Optical Recording Medium A coating layer was formed in the same manner as in Example 1 except that 0.15 g of the chelate compound of a dis-azo compound with nickel, obtained in the above Preparation Example (a) was employed. The maximum absorption wavelengths of the coating layer were 652 nm and 705 nm.

Then, on this coating layer, a reflective layer and a protective layer were formed in the same manner as in Example 1 to obtain an optical recording medium.

(c) Optical Recording

While rotating the above recording medium at a speed of 1.2 m/s, a semiconductor laser beam having a center wavelength of 780 nm was irradiated with a recording power of 6.8 mW to record EFM signals. Then, this recorded portion was reproduced by a CD player with a semiconductor laser having a center wavelength of 780 nm, whereby excellent reproduction signals were obtained.

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 3

Figure 5:
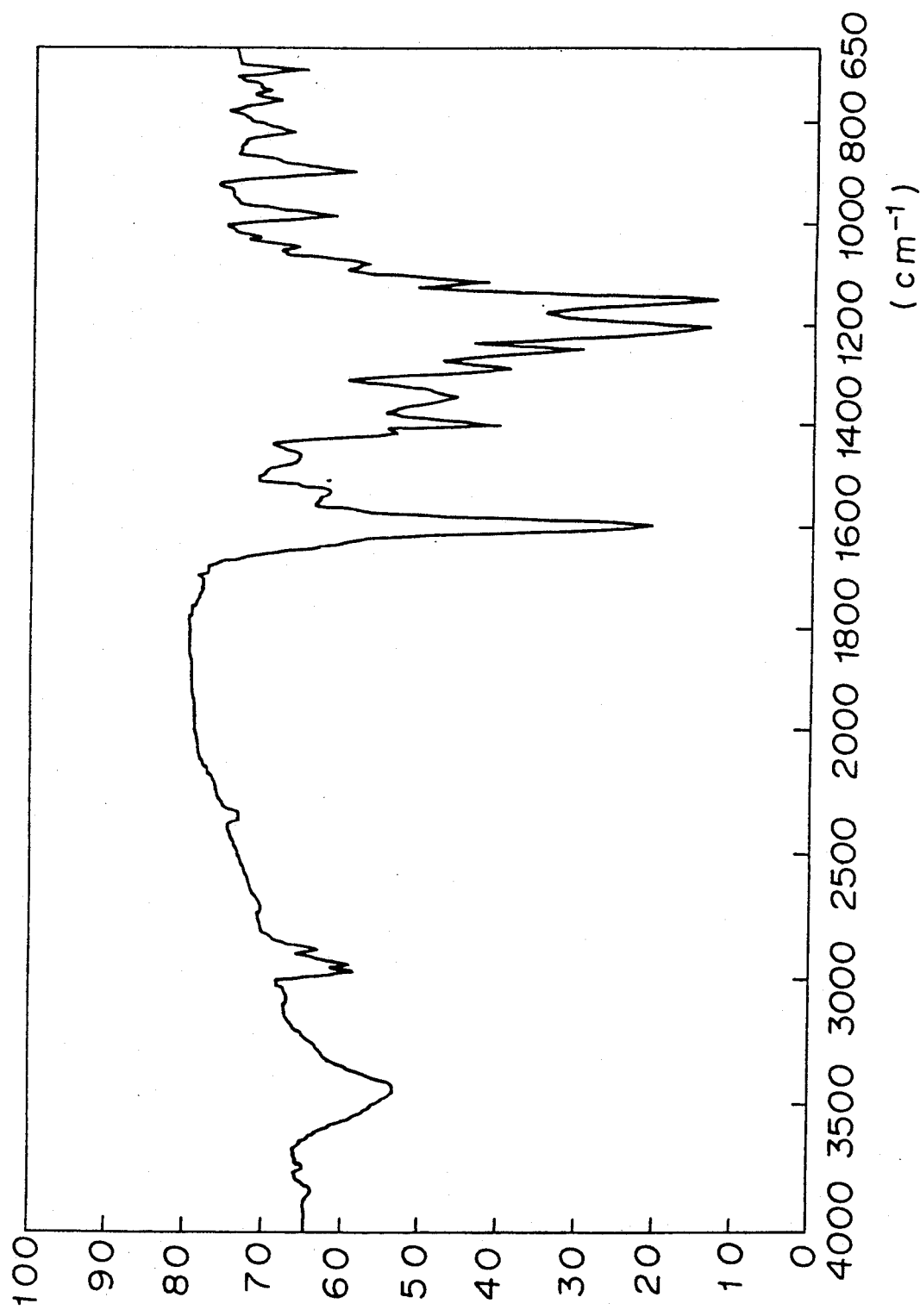
FIG. 5 is a drawing showing an infrared absorption spectrum of the nickel chelate compound obtained in Example 3.

(a) Preparation of a Compound 0.03 g of a dis-azo compound represented by the following structural formula:

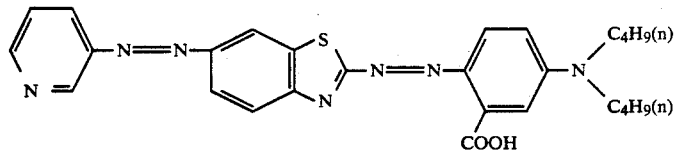

was dissolved in a mixture solution comprising 30 ml of tetrahydrofuran and 30 ml of water, and 0.087 g of nickel acetate was added thereto, followed by stirring at room temperature. After adding excess water, precipitated crystals were collected by filtration, washed with methanol and dried to obtain 0.253 g of a nickel chelate compound as brown crystals. The maximum absorption wavelength (in chloroform) of this compound was 659 nm. Further, the infrared absorption spectrum of this compound is shown in FIG. 5.

Physical properties
Melting point: 203-204° C. (decomposed)
λmax=659 nm (in chloroform)
$\epsilon = 7.5 \times 10^4$ (b) Preparation of an Optical Recording Medium A coating layer was formed in the same manner as in Example 1 except that 0.15 g of the chelate compound of a dis-azo compound with nickel, obtained in the above Preparation Example (a) was employed. The maximum absorption wavelengths of the coating layer were 639 nm and 695 nm.

Then, on this coating layer, a reflective layer and a protective layer were formed in the same manner as in Example 1 to obtain an optical recording medium.

(c) Optical Recording

On the above recording medium, EFM signals were recorded and then reproduced in the same manner as in Example 1, whereby excellent reproduction signals were obtained.

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 4

(a) Preparation of a Compound 2.54 g of 2-amino-6-phenylazobenzothiazol represented by the following structural formula:

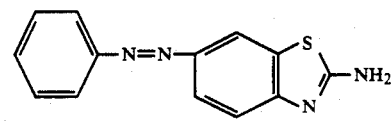

was dissolved in a mixture solution comprising 25 ml of phospholic acid, 35 ml of acetic acid and 12.5 ml of propionic acid, and diazotized at a temperature of from 0 to −3° C. by means of 3.39 g of 45% nitrosylsulfuric acid. To a solution having 3.14 g of sodium 3-diethylaminobenzonesulfonate dissolved in 100 ml of methanol, the diazotized solution thus obtained was dropwise added at a temperature of from 0 to 5° C., followed by neutralization by means of an alkali compound such as sodium acetate or aqueous ammonia. Obtained crystals were collected by filtration and dried to obtain 1.84 g of blackish purple crystals represented by the following structural formula. Further, the maximum absorption wavelength (in chloroform) of this compound was 566 nm.

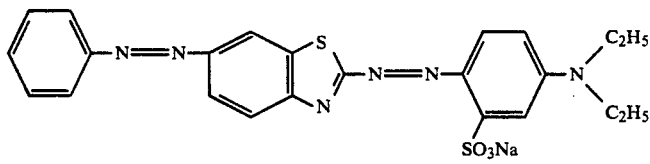

0.5 g of the dis-azo compound thus obtained and 0.08 g of sodium acetate were dissolved in a mixture solution comprising 30 ml of tetrahydrofuran and 30 ml of water, and 0.14 g of nickel acetate was added thereto, followed by stirring at room temperature for 20 hours. The solution was added to 300 ml of water. Precipitated crystals were collected by filtration, washed with methanol and water and dried to obtain 0.22 g of a nickel chelate compound as greenish brown crystals. The maximum absorption wavelength (in chloroform) of this product was 665 nm.

Figure 6:
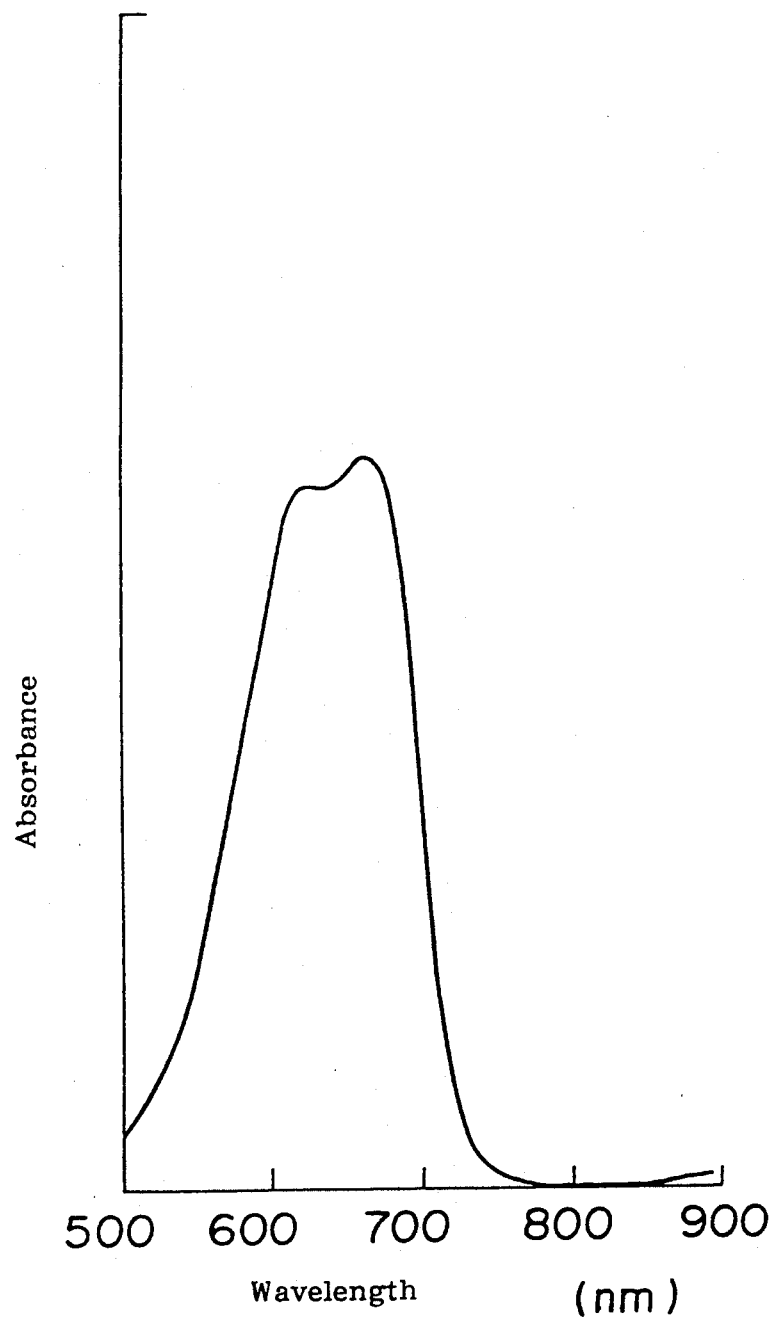
Figure 7:
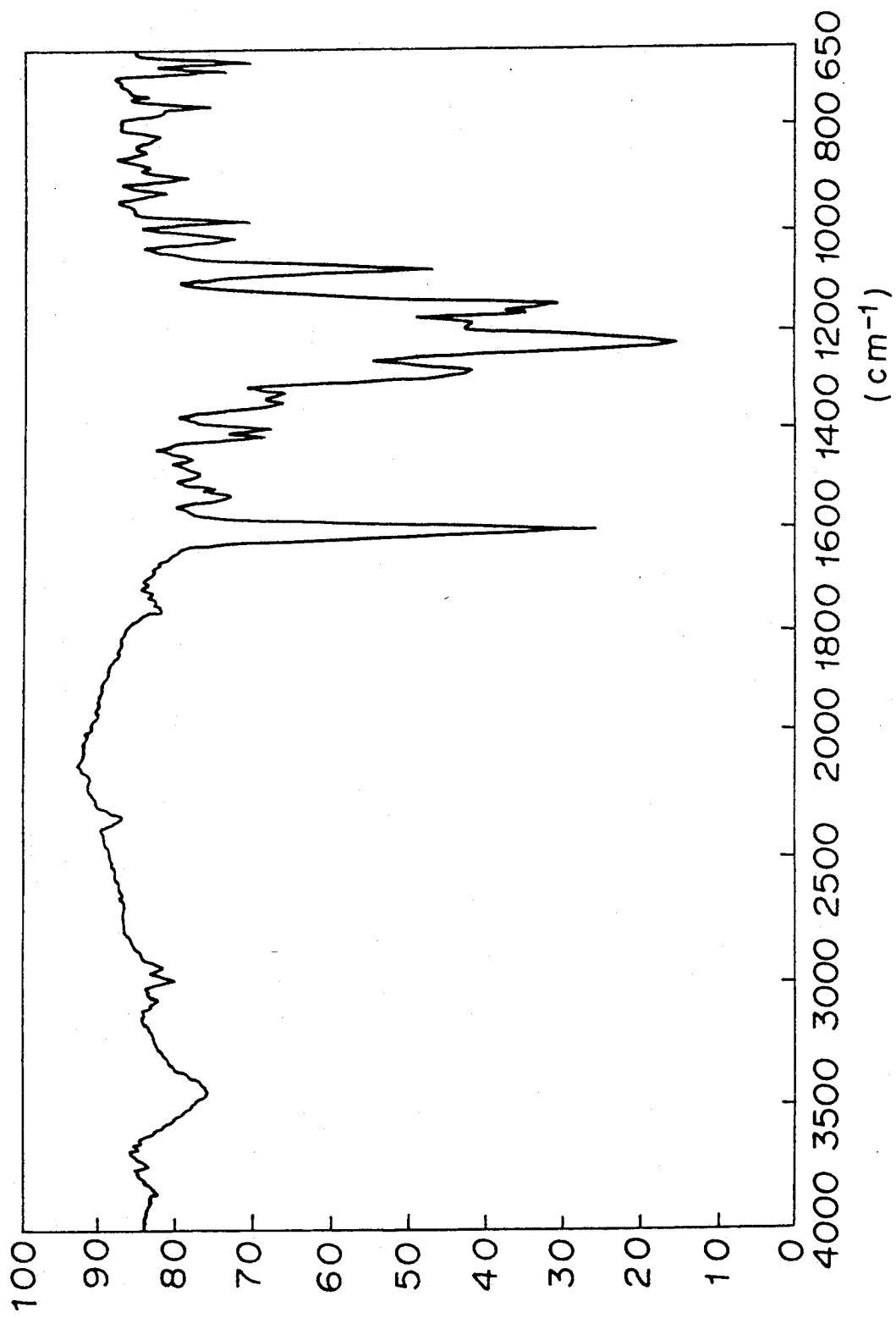
FIG. 7 is a drawing showing an infrared absorption spectrum of a nickel chelate compound obtained in Example 4.

Further, the infrared absorption spectrum of this compound is shown in FIG. 6.

Physical properties
Melting point: at least 250° C.
λmax=665 nm (in chloroform)
$\epsilon = 1.30 \times 10^5$ (b) Preparation of an Optical Recording Medium A coating layer was formed in the same manner as in Example 1 except that 0.15 g of the chelate compound of a dis-azo compound with nickel, obtained in the above Preparation Example (a), was employed. The maximum absorption wavelengths of the coating layer were 649 nm and 706 nm.

Then, on this coating layer, a reflective layer and a protective layer were formed in the same manner as in Example 1 to obtain an optical recording medium.

(c) Optical Recording

On the above recording medium, EFM signals were recorded and then reproduced in the same manner as in Example 1, whereby excellent reproduction signals were obtained.

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 5

(a) Preparation of a Compound 0.5 g of the dis-azo compound prepared in Example 4 and 0.08 g of sodium acetate were dissolved in a mixture solution comprising 30 ml of tetrahydrofuran and 30 ml of water, and 0.15 g of cobalt acetate was added thereto, followed by stirring at room temperature for 20 hours. The solution was added to 300 ml of water. Then, precipitated crystals were collected by filtration, washed with methanol and water and dried to obtain 0.15 g of a cobalt chelate compound as brown crystals. The maximum absorption wavelength (in chloroform) of this compound was 658 nm.

(b) Preparation of an Optical Recording Medium

A coating layer was formed in the same manner as in Example 1 except that 0.15 g of the chelate compound of a dis-azo compound with cobalt, obtained in the above Preparation Example (a), was employed. The maximum absorption wavelengths of the coating layer were 643 nm and 699 nm.

Then, on this coating layer, a reflective layer and a protective layer were formed in the same manner as in Example 1 to obtain an optical recording medium.

(c) Optical Recording

On the above recording medium, EFM signals were recorded and reproduced in the same manner as in Example 1, whereby excellent reproduction signals were obtained.

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 6

Figure 8:
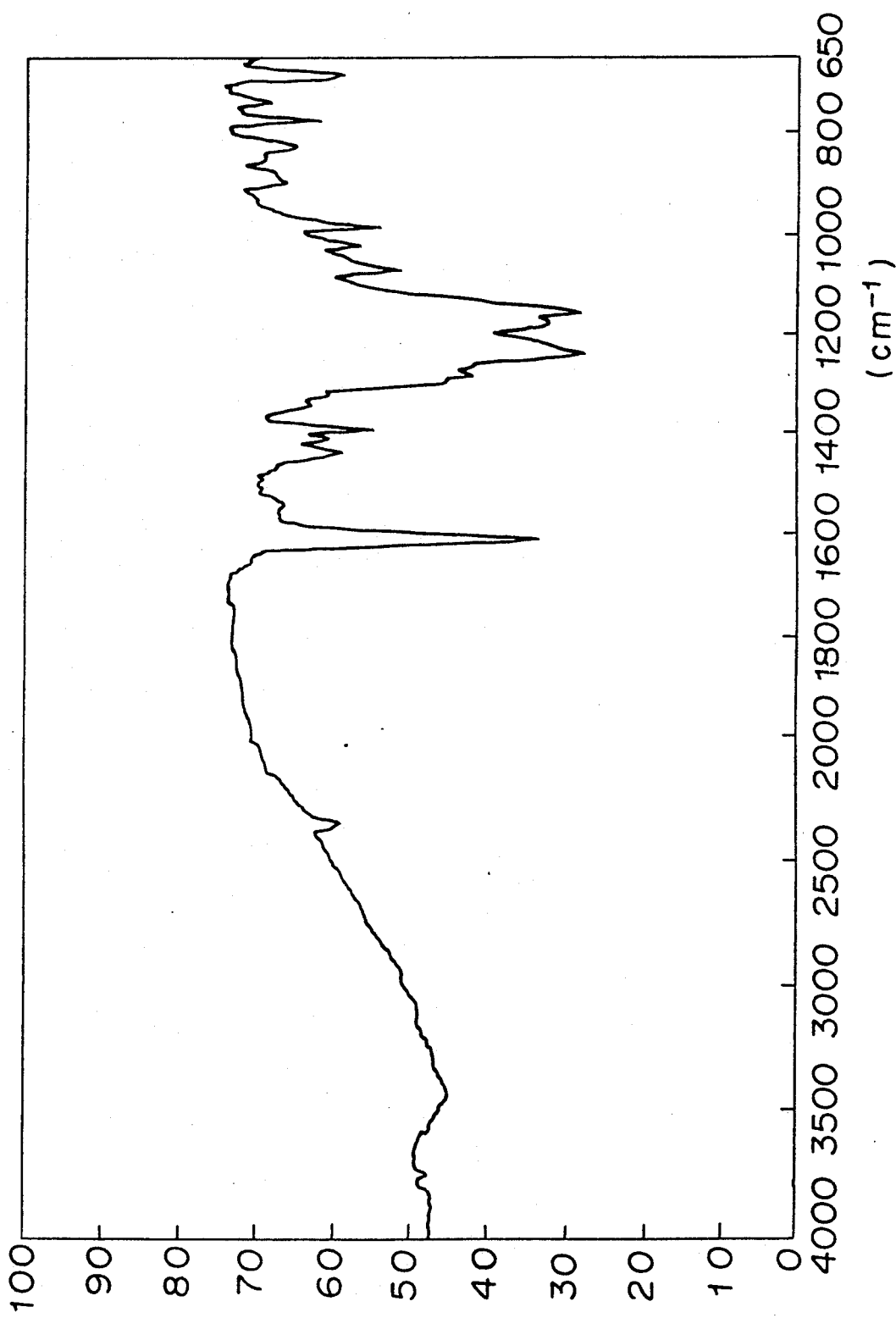
FIG. 8 is a drawing showing an infrared absorption spectrum of the nickel chelate compound obtained in Example 6.

(a) Preparation of a Compound 0.8 g of a dis-azo compound represented by the following structural formula:

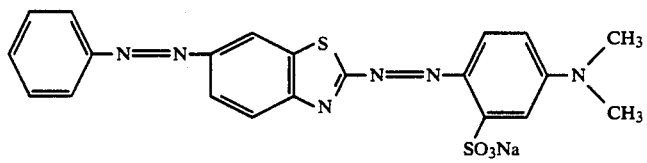

and 0.14 g of sodium acetate were dissolved in a mixture solution comprising 20 ml of tetrahydrofuran and 20 ml of water, and 0.26 g nickel acetate was added thereto, followed by stirring at room temperature for 2 hours. Precipitated crystals were collected by filtration, washed with methanol and toluene and dried to obtain 0.34 g of a nickel chelate compound as brown crystals. The maximum absorption wavelength (in chloroform) of this compound was 658 nm. The infrared absorption spectrum of this compound is shown in FIG. 8.

Physical properties
Melting point: 250° C.
λmax=658 nm (in chloroform)
$\epsilon = 6.7 \times 10^4$ (b) Preparation of an Optical Recording Medium A coating layer was formed in the same manner as in Example 1 except that 0.15 g of the chelate compound of a dis-azo compound with nickel, obtained in the above Preparation Example (a), was employed. The maximum absorption wavelengths of the coating layer were 650 nm and 713 nm.

Then, on this coating layer, a reflective layer and a protective layer were formed in the same manner as in Example 1 to obtain an optical recording medium.

(c) Optical Recording

On the above recording medium, EFM signals were recorded and reproduced in the same manner as in Example 1, whereby excellent reproduction signals were obtained.

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 7

(a) Preparation of a Compound 0.66 g of a dis-azo compound represented by the following structural formula:

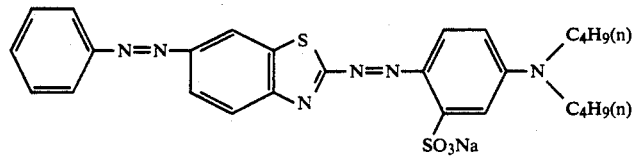

was dissolved in 35 ml of methanol, and 0.17 g of nickel acetate was added thereto, followed by stirring at room temperature for 5 hours. Precipitated crystals were collected by filtration, washed with methanol and dried to obtain 0.010 g of a nickel chelate compound as brown crystals. The maximum absorption wavelength (in chloroform) of this compound was 659 nm.
Physical properties
Melting point: at least 250° C.
$\lambda max = 659$ nm (in chloroform)
$\epsilon = 1.25 \times 10^5$ (b) Preparation of an Optical Recording Medium A coating layer was formed in the same manner as in Example 1 except that 0.15 g of the chelate compound of a dis-azo compound with nickel, obtained in the above Preparation Example (a), was employed. The maximum absorption wavelengths of this coating layer were 643 nm and 704 nm.

Then, on this coating layer, a reflective layer and a protective layer were formed in the same manner as in Example 1 to obtain an optical recording medium.

(c) Optical Recording

On the above recording medium, EFM signals were recorded and reproduced in the same manner as in Example 1, whereby excellent reproduction signals were obtained.

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 8

(a) Preparation of a Compound 0.66 g of the dis-azo compound used in the above Example 7 was dissolved in 35 ml of methanol, and 0.17 g of cobalt acetate was added thereto, followed by stirring at room temperature for 5 hours. Precipitated crystals were collected by filtration, washed with methanol and dried to obtain 0.14 g of a cobalt chelate compound as brown crystals. The maximum absorption wavelength (in chloroform) of this compound was 652 nm.

(b) Preparation of an Optical Recording Medium

A coating layer was formed in the same manner as in Example 1 except that 0.15 g of the cobalt chelate compound of a dis-azo compound, obtained in the above Preparation Example (a), was employed. The maximum absorption wavelengths of the coating layer were 643 nm and 692 nm.

Then, on this coating layer, a reflective layer and a protective layer were formed in the same manner as in Example 1 to obtain an optical recording medium.

(c) Optical Recording

On the above recording medium, EFM signals were recorded and reproduced in the same manner as in Example 1, whereby excellent reproduction signals were obtained.

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 9

Figure 9:
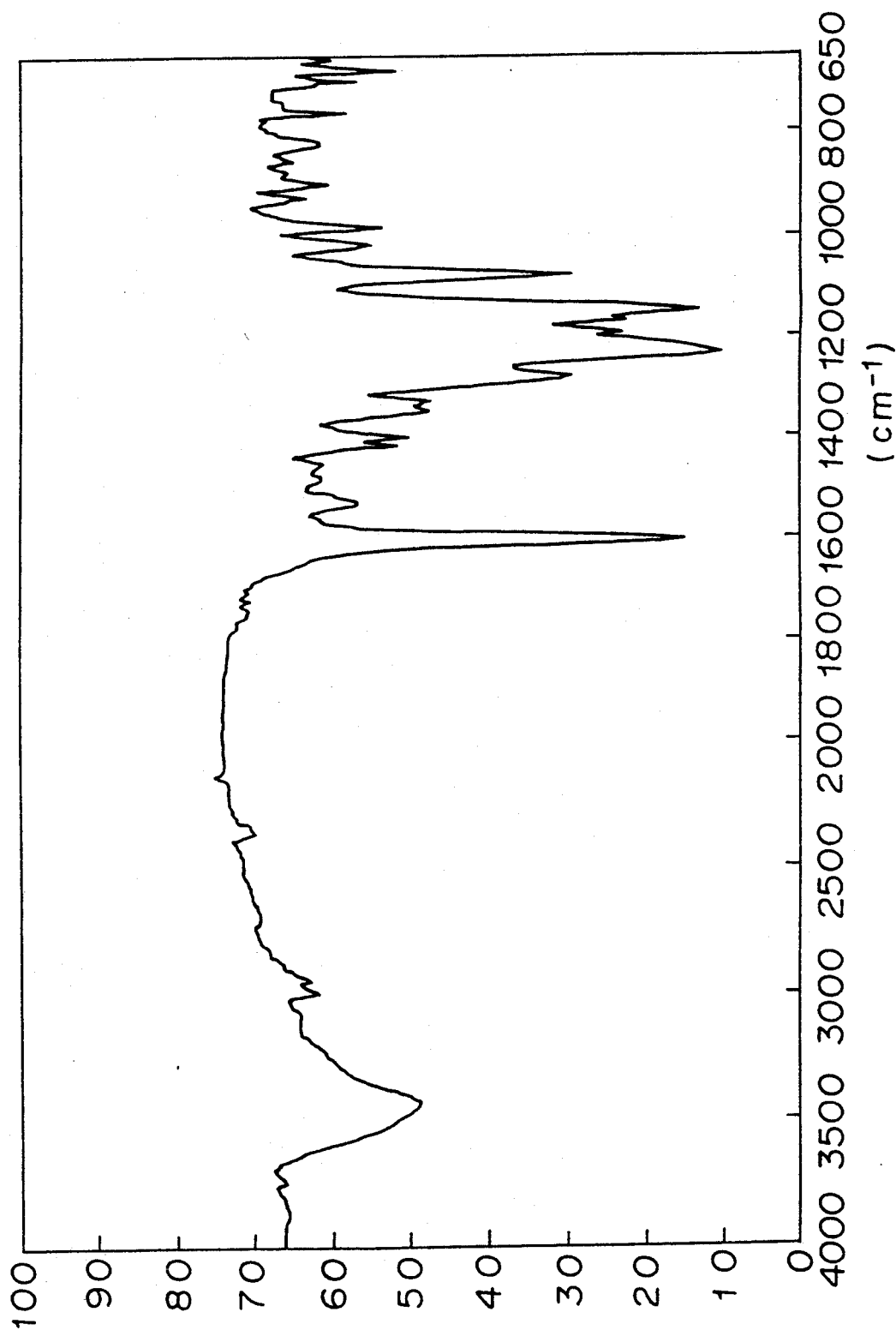
FIG. 9 is a drawing showing an infrared absorption spectrum of the nickel chelate compound obtained in Example 9.

(a) Preparation of a Compound 0.3 g of a dis-azo compound represented by the following structural formula:

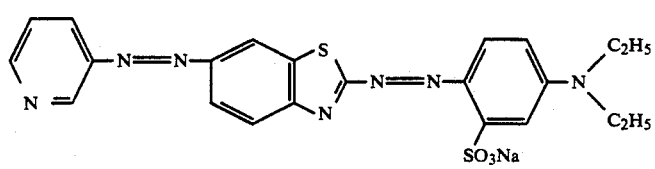

and 0.048 g of sodium acetate were dissolved in 30 ml of tetrahydrofuran and 30 ml of water, and 0.087 g nickel acetate was added thereto, followed by stirring at room temperature for 20 hours. Precipitated crystals were collected by filtration, washed with methanol, water and toluene and dried to obtain 0.16 g of a nickel chelate compound as brown crystals. The maximum absorption wavelength (in chloroform) of this compound was 665 nm. The infrared absorption spectrum of this compound is shown in FIG. 9.

Physical properties
Melting point: at least 250° C.
$\lambda max = 665$ nm (in chloroform)
$\epsilon = 1.19 \times 10^5$ (b) Preparation of an Optical Recording Medium A coating layer was formed in the same manner as in Example 1 except that 0.15 g of the chelate compound of a dis-azo compound with nickel, obtained in the above Preparation Example (a), was employed. The maximum absorption wavelengths of the coating layer were 646 nm and 714 nm.

Then, on this coating layer, a reflective layer and a protective layer were formed in the same manner as in Example 1 to obtain an optical recording medium.

(c) Optical Recording

On the above recording medium, EFM signals were recorded and reproduced in the same manner as in Example 1, whereby excellent reproduction signals were obtained.

The maximum absorption wavelength (in chloroform) of this compound was 646 nm.

(b) Preparation of an Optical Recording Medium

A coating layer was formed in the same manner as in Example 1 except that 0.15 g of the chelate compound of a dis-azo compound with nickel, obtained in the above Preparation Example (a), was dissolved in 5 g of tetrafluoropropanol. The maximum absorption wavelengths of this coating layer were 626 nm and 682 nm.

Then, on this coating layer, a reflective layer and a protective layer were formed in the same manner as in Example 1 to obtain an optical recording medium.

(c) Optical Recording

On the above recording medium, EFM signals were recorded and reproduced in the same manner as in Example 1, whereby excellent reproduction signals were obtained.

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 11

(a) Preparation Example

A dis-azo compound represented by the following structural formula:

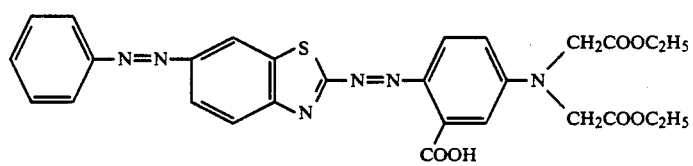

was dissolved in 50 ml of acetone, and 2.6 g of 40% nickel borofluoride was added thereto, followed by filtration. The filtrate was poured into a solution having 50 g of sodium borofluoride dissolved in 50 ml of water, and excess water was further added to precipitate crystals. The obtained crystals were collected by filtration and dried to obtain 0.5 g of a nickel chelate compound as black crystals. The maximum absorption wavelength (in chloroform) of this compound was 640 nm.

(b) Preparation of an Optical Recording Medium

A coating layer was formed in the same manner as in

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 10

(a) Preparation of a Compound 0.8 g of a dis-azo compound represented by the following structural formula:

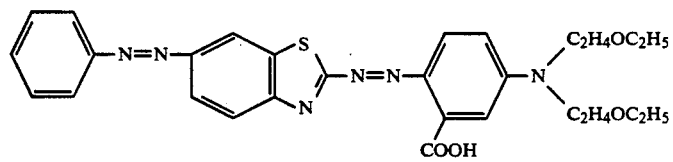

was dissolved in 50 ml of dioxane, and 2.6 g of 40% nickel borofluoride was added thereto, followed by filtration. The filtrate was poured into a solution having 50 g of $NH_4PF_6$ dissolved in 50 ml of water, and excess water was added to precipitate crystals. The obtained crystals were collected by filtration, and dried to obtain 0.55 g of a nickel chelate compound as black crystals.

Example 1 except that 0.15 g of the nickel chelate compound of a dis-azo compound, obtained in the above Preparation Example (a), was dissolved in 5 g of diacetone alcohol. The maximum absorption wavelengths of the coating layer were 621 nm and 678 nm.

(c) Optical Recording

While rotating the above recording medium at a speed of 4 m/s, a He-Ne laser beam of about 1 μm having a center wavelength of 633 nm was irradiated with a recording power of 6.0 mW, whereby a pit having clear outline was formed.

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 12

Compounds as identified in Tables 1 and 2 were prepared in accordance with the methods disclosed in Examples 1 to 11, and chelate compounds with metals were obtained. Then, solutions prepared by using such metal chelate compounds were coated on substrates to obtain optical recording media. Recording was conducted by using a semiconductor laser as a light source, whereby every medium had excellent sensitivity and was excellent also in the light resistance and storage stability.

The maximum wavelengths of the visible range absorption spectra in chloroform of the metal chelate compounds and the maximum absorption wavelengths of the coating layers formed by using such metal chelate compounds, are shown in Tables 1 and 2, respectively.

TABLE 1

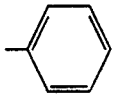

| Compound No. | D | $R^{18}$ | Y | $R^2$ | $R^1$ | $R^{19}$ | Metal ion | Maximum absorption wavelength of the coating layer (nm) |
|---|---|---|---|---|---|---|---|---|
| 12-1 | 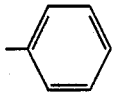 | —H | —COOH | —$C_2H_5$ | —$C_2H_5$ | —H | $Ni^{2+}$ | 625, 664 |
| 12-2 | 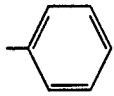 | —H | —COOH | —$C_3H_7(n)$ | —$C_3H_7(n)$ | —H | $Ni^{2+}$ | 628, 667 |
| 12-3 | 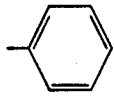 | —H | —COOH | —$C_4H_9(n)$ | —$C_4H_9(n)$ | —H | $Ni^{2+}$ | 628, 668 |
| 12-4 | 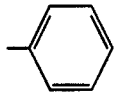 | —H | —COOH | —$C_2H_5$ | —$C_2H_5$ | —H | $Co^{2+}$ | 614, 668 |
| 12-5 | 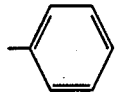 | —H | —COOH | —$C_3H_7(n)$ | —$C_3H_7(n)$ | —H | $Co^{2+}$ | 615, 669 |
| 12-6 |  | —H | —COOH | —$C_4H_9(n)$ | —$C_4H_9(n)$ | —H | $Co^{2+}$ | 617, 673 |
| 12-7 | 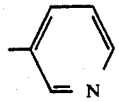 | —H | —COOH | —$CH_3$ | —$CH_3$ | —H | $Co^{2+}$ | 608, 659 |
| 12-8 |  | —Cl | —COOH | —$C_4H_9(n)$ | —$C_4H_9(n)$ | —H | $Ni^{2+}$ | 631, 677 |

TABLE 1-continued

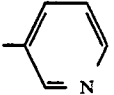

| Compound No. | D | $R^{18}$ | Y | $R^2$ | $R^1$ | $R^{19}$ | Metal ion | Maximum absorption wavelength of the coating layer (nm) |
|---|---|---|---|---|---|---|---|---|
| 12-9 | 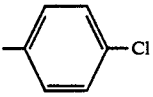 | —CH$_3$ | —COOH | —C$_4$H$_9$(n) | —C$_4$H$_9$(n) | —H | Ni$^{2+}$ | 631, 670 |
| 12-10 | 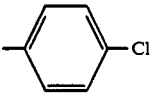 | —CH$_3$ | —COOH | —C$_2$H$_5$ | —C$_2$H$_5$ | —H | Ni$^{2+}$ | 631, 657 |
| 12-11 | 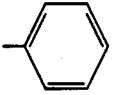 | —CH$_3$ | —COOH | —C$_2$H$_5$ | —C$_2$H$_5$ | —H | Co$^{2+}$ | 618, 665 |
| 12-12 | 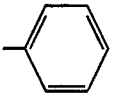 | —H | —NHSO$_2$C$_3$H$_7$ | —C$_2$H$_5$ | —C$_2$H$_5$ | —H | Ni$^{2+}$ | 655 |
| 12-13 | 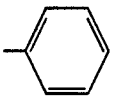 | —CH$_3$ | —OOOH | —CH$_3$ | —CH$_3$ | —H | Ni$^{2+}$ | 652 |
| 12-14 | 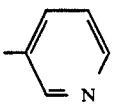 | —H | —SO$_3$Na | —CH$_3$ | —CH$_3$ | —H | Co$^{2+}$ | 614, 651 |
| 12-15 | 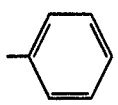 | —H | —SO$_3$Na | —C$_2$H$_5$ | —C$_2$H$_5$ | —OCH$_3$ | Co$^{2+}$ | 635, 672 |

TABLE 2

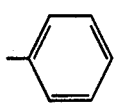

| Compound No. | D | Y | $R^2$ | $R^1$ | Metal ion | Maximum absorption wavelength of the coating maser (nm) |
|---|---|---|---|---|---|---|
| 12-16 | phenyl | —COOH | —C$_2$H$_4$OCH$_3$ | —C$_2$H$_4$OCH$_3$ | Ni$^{2+}$ | 626, 683 |
| 12-17 | phenyl | —COOH | —C$_2$H$_4$OC$_2$H$_4$OCH$_3$ | —C$_2$H$_4$OC$_2$H$_4$OCH$_3$ | Ni$^{2+}$ | 626, 684 |

TABLE 2-continued

Structure: D−N=N−[benzothiazole]−N=N−[phenyl with Y substituent]−N(R¹)(R²)

| Compound No. | D | Y | $R^2$ | $R^1$ | Metal ion | Maximum absorption wavelength of the coating maser (nm) |
|---|---|---|---|---|---|---|
| 12-18 | phenyl | —COOH | —$C_2H_4OC_3H_7(i)$ | —$C_2H_4OC_3H_7(i)$ | $Ni^{2+}$ | 626, 682 |
| 12-19 | phenyl | —COOH | —$CH_2COOCH_3$ | —$CH_2COOCH_3$ | $Ni^{2+}$ | 621, 678 |
| 12-20 | phenyl | —COOH | —$C_2H_5$ | —$CH_2COOC_2H_5$ | $Ni^{2+}$ | 627, 685 |
| 12-21 | phenyl | —COOH | —$C_2H_5$ | —$C_2H_4OC_2H_5$ | $Ni^{2+}$ | 628, 687 |
| 12-22 | phenyl | —COOH | —$C_2H_4OCOCH_3$ | —$C_2H_4OCOCH_3$ | $Ni^{2+}$ | 627, 684 |
| 12-23 | phenyl | —COOH | —$C_2H_5$ | —$C_2H_5$ | $Ni^{2+}$ | 627, 686 |
| 12-24 | phenyl | —COOH | —$C_2H_4OCOC_2H_5$ | —$C_2H_4OCOC_2H_5$ | $Ni^{2+}$ | 627, 683 |
| 12-25 | phenyl | —COOH | —$CH_3$ | —$CH_3$ | $Ni^{2+}$ | 638, 695 |
| 12-26 | phenyl | —COOH | —$C_2H_5$ | —$C_2H_5$ | $Cu^{2+}$ | 636, 695 |
| 12-27 | phenyl | —COOH | —$CH_3$ | —$CH_3$ | $Zn^{2+}$ | 635, 696 |
| 12-28 | 4-Cl-phenyl | —COOH | —$CH_3$ | —$CH_3$ | $Ni^{2+}$ | 637, 695 |
| 12-29 | 4-$CH_3$-phenyl | —COOH | —$CH_3$ | —$CH_3$ | $Ni^{2+}$ | 635, 694 |

TABLE 2-continued

D—N=N—[benzothiazole]—N=N—[phenyl-NR¹R² with Y substituent]

| Compound No. | D | Y | R² | R¹ | Metal ion | Maximum absorption wavelength of the coating maser (nm) |
|---|---|---|---|---|---|---|
| 12-30 | 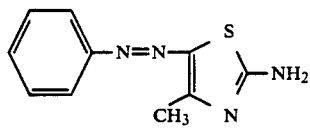 (—C₆H₄—COOCH₃) | —COOH | —C₂H₅ | —C₂H₅ | Ni²⁺ | 636, 695 |

EXAMPLE 13

(a) Preparation of a Compound 2.18 g of 2-amino 4-methyl-5-phenylthiazole represented by the following structural formula:

[structure: phenyl-N=N-C(CH₃)=C-S-C(NH₂)=N thiazole]

was dissolved in a mixture solution comprising 30 ml of phospholic acid, and 60 ml of acetic acid and 5 ml of propionic acid, and diazotized at a temperature of from 0 to −5° C. by means of 3.38 g of 45% nitrosylsulfric acid. To a solution having 1.65 g of 3-dimethylaminobenzoic acid dissolved in 100 ml of methanol, the diazotized solution thus obtained was dropwise added at a temperature of from 0 to 5° C., followed by neutralization by means of an alkali compound such as sodium acetate or aqueous ammonia. The obtained crystals were collected by filtration and dried to obtain 1.75 g of blackish brown crystals represented by the following structural formula. The maximum wavelength (in chloroform) of this compound was 623 nm.

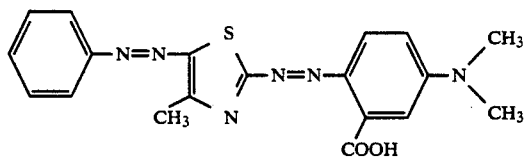

Figure 10:
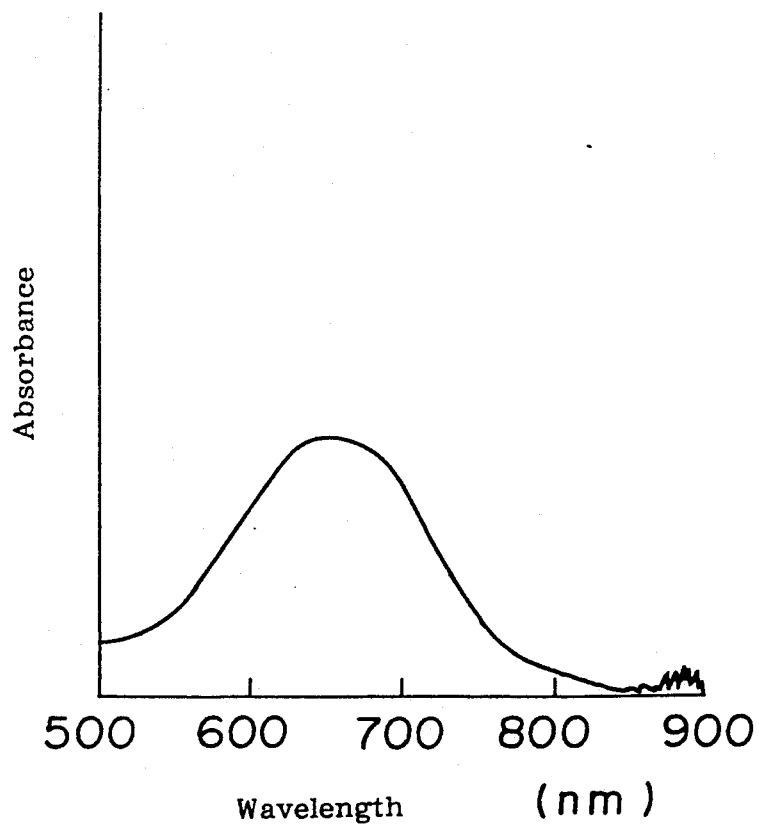
FIG. 10 is a drawing showing a visible range absorption spectrum of the nickel chelate compound obtained in Example 13.

1.0 of the dis-azo compound thus obtained was dissolved in 50 ml of tetrahydrofuran, and 3.6 g of 40% nickel borofluoride was added, followed by filtration. The filtrate was poured into a solution having 50 g of sodium borofluoride dissolved in 50 ml of water, and excess water was further added to precipitate crystals. The crystals thus obtained, were collected by filtration and dried to obtain 0.2 g of a nickel chelate compound as black crystals. The maximum absorption wavelength (in chloroform) of this compound was 650 nm (see FIG. 10).

Figure 11:
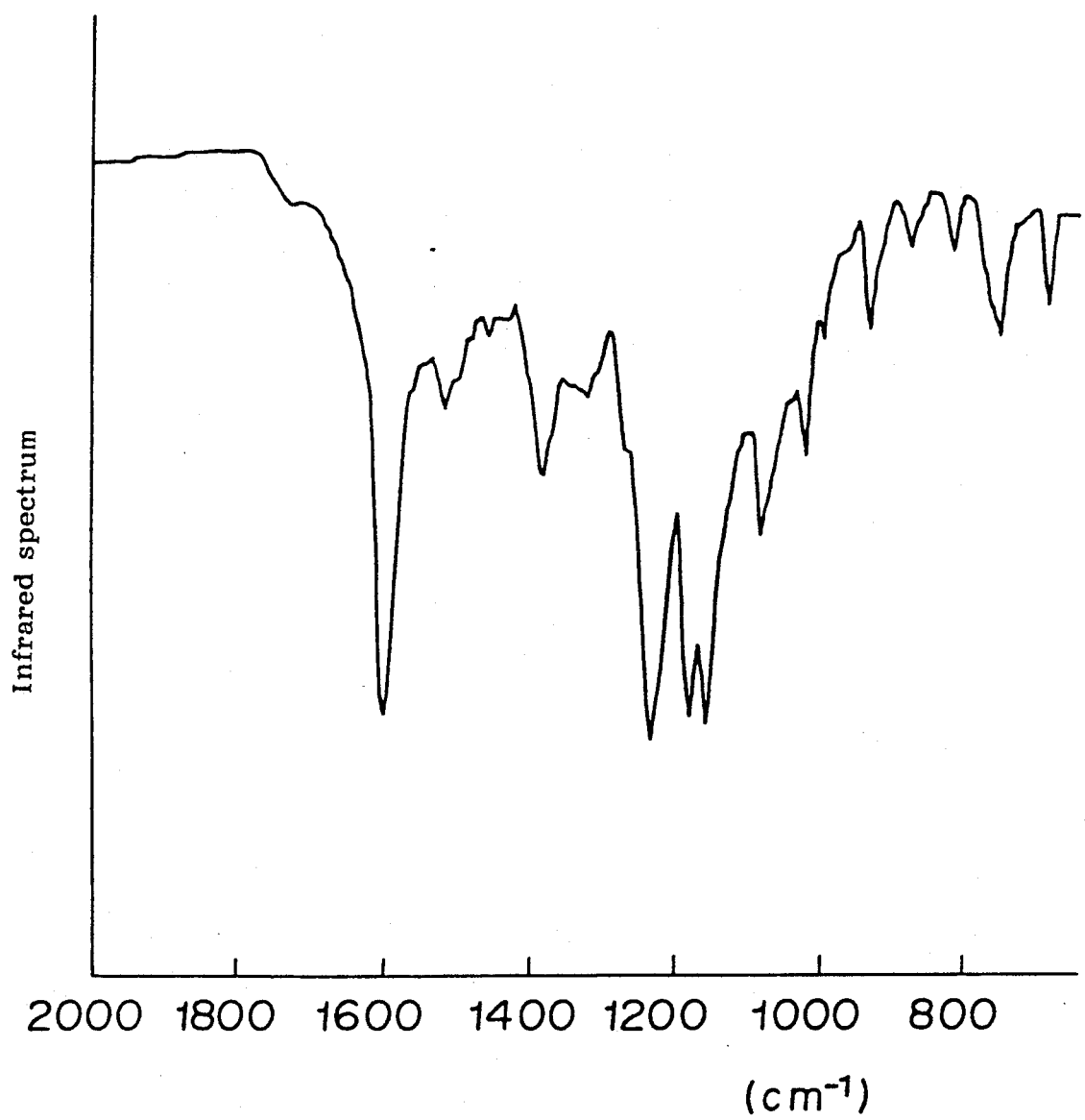
FIG. 11 is a drawing showing an infrared absorption spectrum of the nickel chelate compound obtained in Example 13.

Further, the infrared absorption spectrum of this compound is shown in FIG. 11.

(b) Preparation of an Optical Recording Medium

Figure 12:
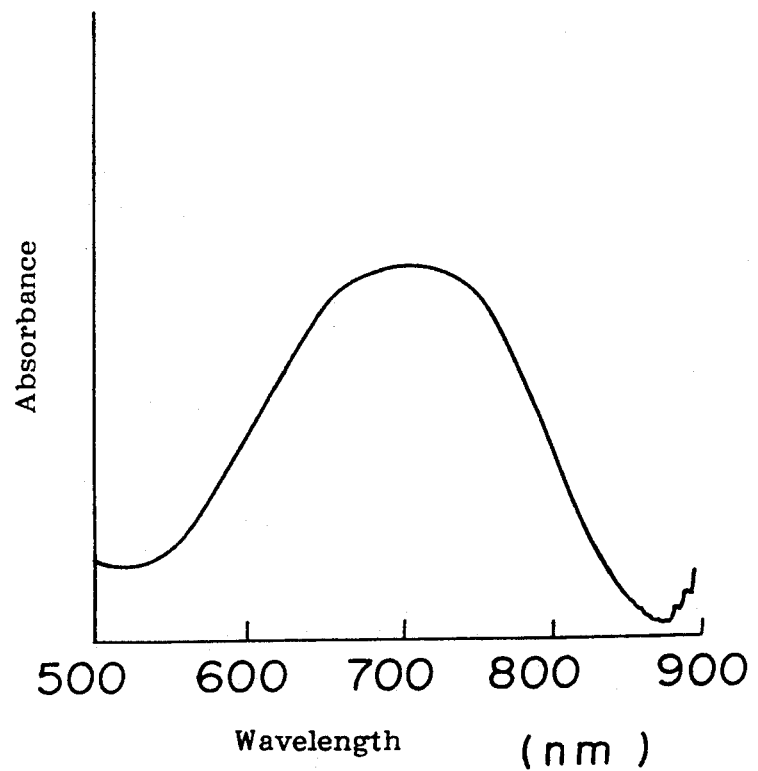
FIG. 12 is a drawing showing an absorption spectrum of the coating layer of Example 13.

A coating layer was formed in the same manner as in Example 1 except that 0.15 g of the chelate compound of a dis-azo compound with nickel, obtained in the above Preparation Example (a), was employed. The maximum absorption wavelengths of the coating layer were 660 nm and 715 nm. In FIG. 12, the absorption spectrum of the coating layer is shown.

(c) Optical Recording

While rotating the above optical recording medium at a speed of 1.2 m/s, a semiconductor laser beam having a center wavelength of 780 nm was irradiated with a recording power of 7.0 mW, whereby a clear pit was formed.

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 14

(a) Preparation of a compound 1.0 g of a dis-azo compound represented by the following structural formula:

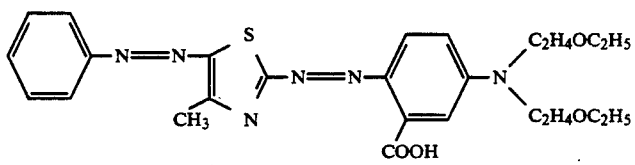

was dissolved in 50 ml of dioxane, and 3.6 g of 40% nickel borofluoride was added thereto, followed by filtration. The filtrate was poured into a solution having 50 g of NH₄PF₆ dissolved in 500 ml of water, and excess water was further added to precipitate crystals. The crystals thus obtained, were collected by filtration and dried to obtain 0.35 g of a nickel chelate compound as blackish crystals. The maximum absorption wavelength (in chloroform) of this compound was 642 nm.

(b) Preparation of an Optical Recording Medium

A coating layer was formed in the same manner as in Example 1 except that 0.15 g of the chelate compound of a dis-azo compound with nickel, obtained in the above Preparation Example (a), was dissolved in 5 g of tetrafluoropropanol. The maximum absorption wavelengths of this coating layer were 645 nm and 700 nm.

Then, on this coating layer, a reflective layer and a protective layer were formed in the same manner as in Example 1 to obtain an optical recording medium.

(c) Optical Recording

On the above recording medium, EFM signals were recorded and reproduced in the same manner as in Example 1, whereby excellent reproduction signals were obtained.

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 15

(a) Preparation Example 1.0 g of a dis-azo compound represented by the following structural formula:

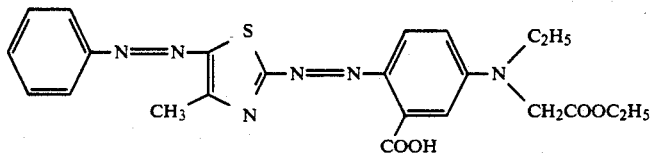

was dissolved in 50 ml of acetone, and 3.6 g of 40% nickel borofluoride was added thereto, followed by filtration. The filtrate was poured into a solution having 50 g of sodium borofluoride dissolved in 50 ml of water, and excess water was further added to precipitate crystals. The crystals thus obtained were collected by filtration and dried to obtain 0.3 g of a nickel chelate compound as black crystals. The maximum absorption wavelength (in chloroform) of this compound was 640 nm.

(b) Preparation of an Optical Recording Medium

A coating layer was formed in the same manner as in Example 1 except that 0.15 g of the chelate compound of a dis-azo compound with nickel, prepared in the above Preparation Example (a), was dissolved in 5 g of diacetone alcohol and the rotational speed of the spinning method was changed to 700 rpm. The maximum absorption wavelengths of the coating layer were 650 nm and 703 nm.

(c) Optical Recording

While rotating the above recording medium at a speed of 4 m/s in the same manner as in Example 11, a He-Ne laser beam of about 1 $\mu$m having a center wavelength of 633 nm was irradiated with a recording power of 6.0 mW, whereby a pit having a clear outline was formed.

Further, the light resistance and storage stability tests were conducted in the same manner as in Example 1, whereby no deterioration in the sensitivity and reproduction signals was observed as compared with the initial values, and the medium was found to be excellent as an optical recording medium.

EXAMPLE 16

Compounds as identified in Table 3 were prepared in accordance with the methods disclosed in Examples 13 to 15 and chelate compounds with metals were obtained. Then, solutions prepared by using these metal chelate compounds were coated on substrates to obtain optical recording media. Recording was conducted by using a semiconductor laser as a light source, whereupon every medium had excellent sensitivity and was excellent also in the light resistance and storage stability.

The maximum absorption wavelengths of the coating layers employing the metal chelate compounds are shown in Table 3.

Further, in addition to the compounds used in the above Examples, specific examples of the metal chelate compound of a dis-azo compound with metal, useful for the optical recording medium of the present invention, are as shown in Table 4.

TABLE 3

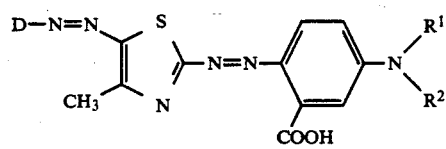

| Compound No. | D | $R^2$ | $R^1$ | Metal ion | Maximum absorption wavelength of the coating laser (nm) |
| --- | --- | --- | --- | --- | --- |
| 16-1 | ⌬ | $-C_2H_5$ | $-C_2H_5$ | $Ni^{2+}$ | 660, 710 |

TABLE 3-continued

[Structure: D—N=N—C(=C(CH3)—N=)—S—C(=N—N=Ar)— where Ar is phenyl with COOH ortho and N(R1)(R2) para]

| Compound No. | D | R² | R¹ | Metal ion | Maximum absorption wavelength of the coating laser (nm) |
|---|---|---|---|---|---|
| 16-2 | 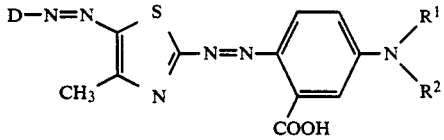 | —C₃H₇(n) | —C₃H₇(n) | Ni²⁺ | 655, 707 |
| 16-3 | 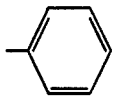 | —C₄H₉(n) | —C₄H₉(n) | Ni²⁺ | 656, 706 |
| 16-4 | 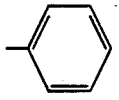 | —C₂H₄OCH₃ | —C₂H₄OCH₃ | Ni²⁺ | 648, 699 |
| 16-5 | 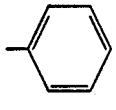 | —C₂H₄OC₂H₄OCH₃ | —C₂H₄OC₂H₄OCH₃ | Ni²⁺ | 645, 692 |
| 16-6 | 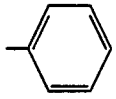 | —C₂H₄OC₃H₇(i) | —C₂H₄OC₃H₇(i) | Ni²⁺ | 647, 695 |
| 16-7 | 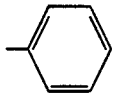 | —CH₂COOCH₃ | —CH₂COOCH₃ | Ni²⁺ | 640, 690 |
| 16-8 | 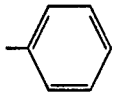 | —C₂H₄OC₂H₅ | —C₂H₄OC₂H₅ | Ni²⁺ | 648, 697 |
| 16-9 | 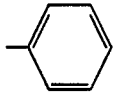 | —C₂H₅ | —C₂H₄OC₂H₅ | Ni²⁺ | 650, 700 |
| 16-10 | 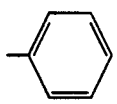 | —C₂H₄OCOCH₃ | —C₂H₄OCOCH₃ | Ni²⁺ | 651, 699 |
| 16-11 | 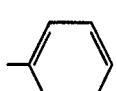 | —C₂H₅ | —C₂H₄OCOCH₃ | Ni²⁺ | 653, 701 |
| 16-12 | 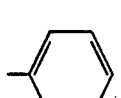 | —C₂H₄OCOOC₂H₅ | —C₂H₄OCOOC₂H₅ | Ni²⁺ | 652, 700 |
| 16-13 | 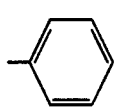 | —CH₃ | —CH₃ | Ni²⁺ | 664, 710 |

TABLE 3-continued

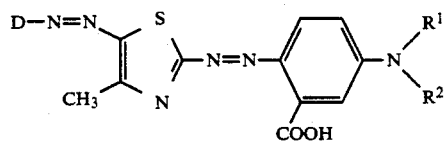

| Compound No. | D | R² | R¹ | Metal ion | Maximum absorption wavelength of the coating laser (nm) |
|---|---|---|---|---|---|
| 16-14 | phenyl | —CH₃ | —CH₃ | Co²⁺ | 665, 712 |
| 16-15 | phenyl | —C₂H₅ | —C₂H₅ | Cu²⁺ | 660, 708 |
| 16-16 | phenyl | —CH₃ | —CH₃ | Zu²⁺ | 658, 714 |
| 16-17 | 4-Cl-phenyl | —CH₃ | —CH₃ | Ni²⁺ | 650, 700 |
| 16-18 | 4-CH₃-phenyl | —CH₃ | —CH₃ | Ni²⁺ | 648, 699 |
| 16-19 | 4-COOCH₃-phenyl | —C₂H₅ | —C₂H₅ | Ni²⁺ | 653, 704 |

TABLE 4

| Disazo compound | Metal ion |
|---|---|
| cyclohexyl-C₆H₄-N=N-benzothiazole-N=N-C₆H₃(COOH)-N(CH₃)₂ | Ni²⁺ |
| H₅C₂O-C₆H₄-N=N-benzothiazole-N=N-C₆H₃(COOH)-N(C₂H₅)₂ | Ni²⁺ |
| H₃COOC-C₆H₄-N=N-benzothiazole-N=N-C₆H₃(COOH)-N(C₂H₅)₂ | Ni²⁺ |

TABLE 4-continued
| Disazo compound | Metal ion |
|---|---|
| 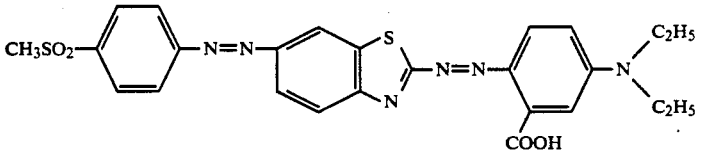 | Ni²⁺ |
| 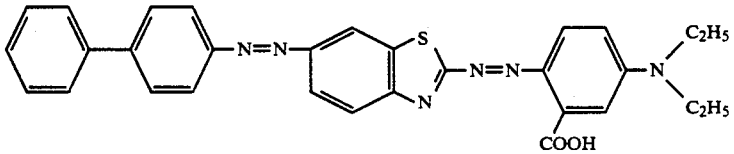 | Ni²⁺ |
| 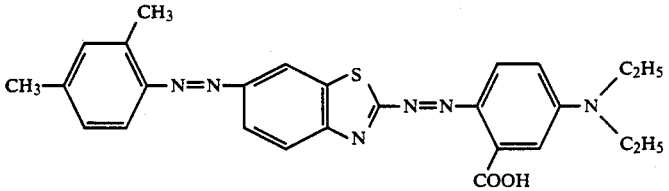 | Ni²⁺ |
| 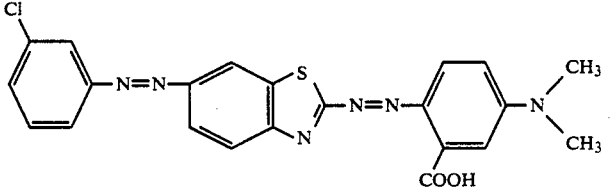 | Ni²⁺ |
| 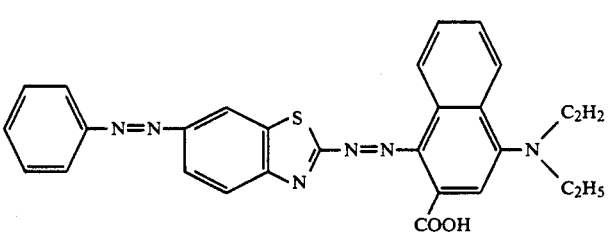 | Ni²⁺ |
| 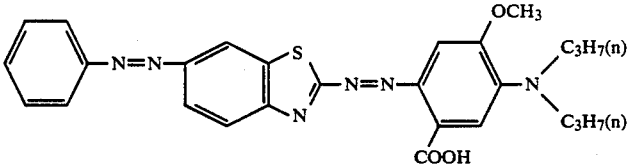 | Ni²⁺ |
| 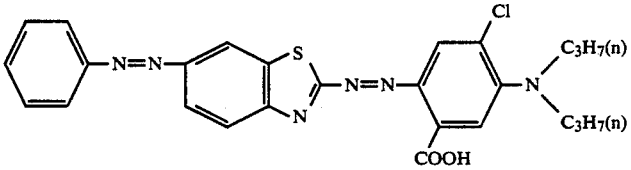 | Ni²⁺ |
| 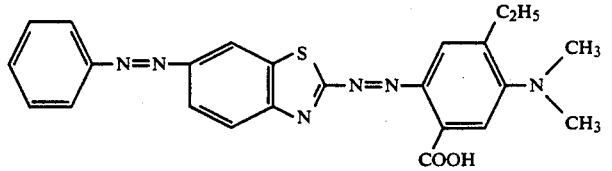 | Ni²⁺ |

TABLE 4-continued

| Disazo compound | Metal ion |
|---|---|
| (structure: phenyl-N=N-benzothiazole-N=N-phenyl with COOH and N(H-cyclohexyl)(C₂H₅) substituents) | $Ni^{2+}$ |
| (structure: phenyl-N=N-benzothiazole-N=N-phenyl with COOH and N(CH₂CH=CH₂)₂ substituents) | $Ni^{2+}$ |
| (structure: phenyl-N=N-benzothiazole-N=N-phenyl with COOH and N(C₂H₅)(CH₂CH=CH₂) substituents) | $Ni^{2+}$ |
| (structure: phenyl-N=N-benzothiazole-N=N-phenyl with COOH and N(C₂H₅)(C₂H₄CN) substituents) | $Ni^{2+}$ |
| (structure: phenyl-N=N-benzothiazole-N=N-phenyl with COOH and N(C₂H₅)(C₂H₄OH) substituents) | $Ni^{2+}$ |
| (structure: phenyl-N=N-(Cl-benzothiazole)-N=N-phenyl with COOH and N(C₂H₅)(CH₂-tetrahydrofuranyl) substituents) | $Ni^{2+}$ |
| (structure: phenyl-N=N-(CH₃-benzothiazole)-N=N-phenyl with COOH and N(C₂H₅)(C₂H₄Cl) substituents) | $Ni^{2+}$ |
| (structure: phenyl-N=N-(Cl-benzothiazole)-N=N-phenyl with COOH and N(CH=CH₂)(C₂H₅) substituents) | $Ni^{2+}$ |
| (structure: pyridyl-N=N-benzothiazole-N=N-phenyl with COOH and N(CH₃)₂ substituents) | $Ni^{2+}$ |

TABLE 4-continued

| Disazo compound | Metal ion |
|---|---|
| (thiophene-CN)–N=N–(benzothiazole)–N=N–(phenyl-N(CH₃)₂, COOH) | $Ni^{2+}$ |
| (CH₃-thiazoline)–N=N–(benzothiazole)–N=N–(phenyl-N(CH₃)₂, COOH) | $Ni^{2+}$ |
| (pyridyl)–N=N–(benzothiazole)–N=N–(phenyl-N(CH₃)₂, COOH) | $Ni^{2+}$ |
| ($H_5C_2$-thiadiazole)–N=N–(benzothiazole)–N=N–(phenyl-N(CH₃)₂, COOH) | $Ni^{2+}$ |
| (I-phenyl)–N=N–(benzothiazole)–N=N–(phenyl-N(CH₃)₂, COOH) | $Ni^{2+}$ |
| ($CF_3$-phenyl)–N=N–(benzothiazole)–N=N–(phenyl-N(CH₃)₂, COOH) | $Ni^{2+}$ |
| ($H_5C_2S$-thiadiazole)–N=N–(benzothiazole)–N=N–(phenyl-N(CH₃)₂, COOH) | $Ni^{2+}$ |
| (NC,NC,N-$C_2H_5$-imidazole)–N=N–(benzothiazole)–N=N–(phenyl-N(CH₃)₂, COOH) | $Ni^{2+}$ |
| (benzothiazol-2-yl)–N=N–(benzothiazole)–N=N–(phenyl-N(CH₃)₂, COOH) | $Ni^{2+}$ |

TABLE 4-continued

| Disazo compound | Metal ion |
|---|---|
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |

TABLE 4-continued
| Disazo compound | Metal ion |
|---|---|
| 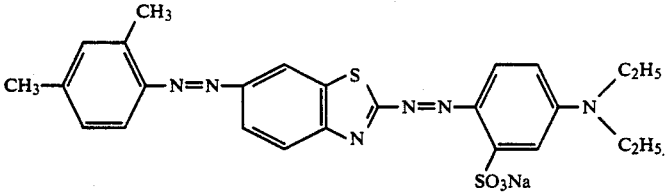 | Ni$^{2+}$ |
| 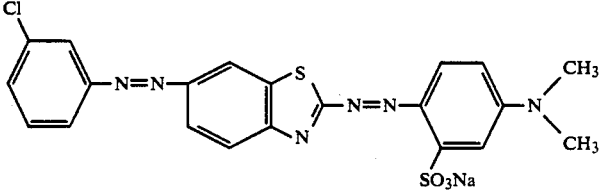 | Ni$^{2+}$ |
| 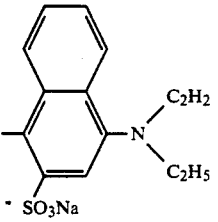 | Ni$^{2+}$ |
| 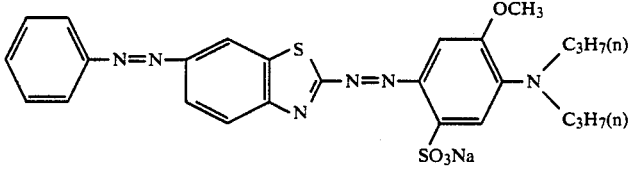 | Ni$^{2+}$ |
| 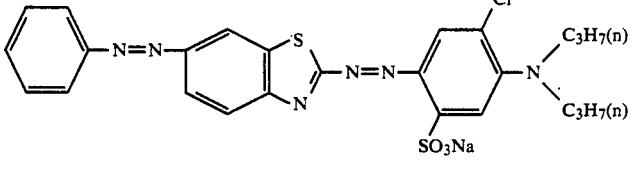 | Ni$^{2+}$ |
| 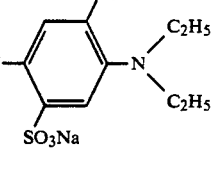 | Ni$^{2+}$ |
| 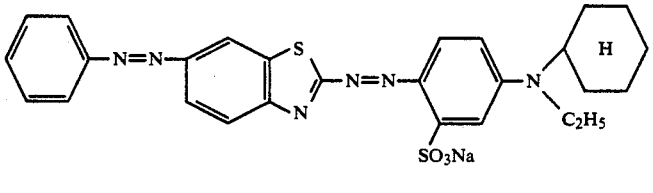 | Ni$^{2+}$ |
| 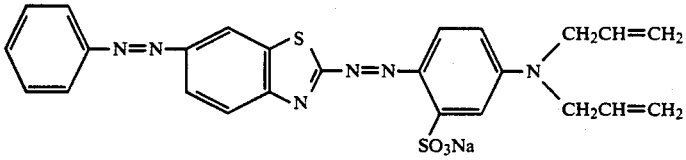 | Ni$^{2+}$ |

TABLE 4-continued

| Disazo compound | Metal ion |
|---|---|
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |

TABLE 4-continued

| Disazo compound | Metal ion |
|---|---|
| (thiophene-CN)–N=N–(benzothiazole)–N=N–(C6H3)(N(CH3)2)(SO3Na) | Ni$^{2+}$ |
| (CH3-thiazole)–N=N–(benzothiazole)–N=N–(C6H3)(N(CH3)2)(SO3Na) | Ni$^{2+}$ |
| (pyridine)–N=N–(benzothiazole)–N=N–(C6H3)(N(CH3)2)(SO3Na) | Ni$^{2+}$ |
| (H5C2–thiadiazole)–N=N–(benzothiazole)–N=N–(C6H3)(N(CH3)2)(SO3Na) | Ni$^{2+}$ |
| (H5C2S–thiadiazole)–N=N–(benzothiazole)–N=N–(C6H3)(N(CH3)2)(SO3Na) | Ni$^{2+}$ |
| (NC,NC,N-C2H5–imidazole)–N=N–(benzothiazole)–N=N–(C6H3)(N(CH3)2)(SO3Na) | Ni$^{2+}$ |
| (benzothiazole)–N=N–(benzothiazole)–N=N–(C6H3)(N(CH3)2)(SO3Na) | Ni$^{2+}$ |
| (H5C2S–thiadiazole isomer)–N=N–(benzothiazole)–N=N–(C6H3)(N(CH3)2)(SO3Na) | Ni$^{2+}$ |
| (CH3SO–thiadiazole)–N=N–(benzothiazole)–N=N–(C6H3)(N(CH3)2)(SO3Na) | Ni$^{2+}$ |

TABLE 4-continued

| Disazo compound | Metal ion |
|---|---|
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |
| (structure) | $Ni^{2+}$ |

TABLE 4-continued

| Disazo compound | Metal ion |
|---|---|
| (phenyl-N=N-thiazole(CH₃, S, N)-C=N-N=naphthyl(COOH, N(C₂H₂)(C₂H₅))) | $Ni^{2+}$ |
| (phenyl-N=N-thiazole(CH₃, S, N)-C=N-N=phenyl(OCH₃, COOH, N(C₃H₇(n))₂)) | $Ni^{2+}$ |
| (phenyl-N=N-thiazole(CH₃, S, N)-C=N-N=phenyl(Cl, COOH, N(C₃H₇(n))₂)) | $Ni^{2+}$ |
| (phenyl-N=N-thiazole(CH₃, S, N)-C=N-N=phenyl(C₂H₅, COOH, N(CH₃)₂)) | $Ni^{2+}$ |
| (phenyl-N=N-thiazole(CH₃, S, N)-C=N-N=phenyl(COOH, N(cyclohexyl-H)(C₂H₅))) | $Ni^{2+}$ |
| (phenyl-N=N-thiazole(CH₃, S, N)-C=N-N=phenyl(COOH, N(CH₂CH=CH₂)₂)) | $Ni^{2+}$ |
| (phenyl-N=N-thiazole(CH₃, S, N)-C=N-N=phenyl(COOH, N(C₂H₅)(CH₂CH=CH₂))) | $Ni^{2+}$ |
| (phenyl-N=N-thiazole(CH₃, S, N)-C=N-N=phenyl(COOH, N(C₂H₅)(C₂H₄CN))) | $Ni^{2+}$ |

TABLE 4-continued

| Disazo compound | Metal ion |
|---|---|
| (structure) | Ni²⁺ |
| (structure) | Ni²⁺ |
| (structure) | Ni²⁺ |
| (structure) | Ni²⁺ |
| (structure) | Ni²⁺ |
| (structure) | Ni²⁺ |
| (structure) | Ni²⁺ |
| (structure) | Ni²⁺ |
| (structure) | Ni²⁺ |

TABLE 4-continued
| Disazo compound | Metal ion |
|---|---|
|  | Ni²⁺ |
|  | Ni²⁺ |
| 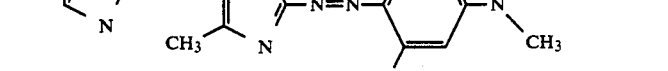 | Ni²⁺ |
|  | Ni²⁺ |
| 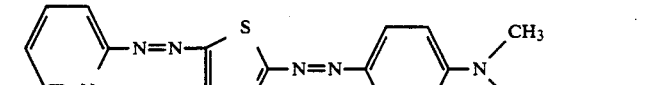 | Ni²⁺ |
|  | Ni²⁺ |
|  | Ni²⁺ |
| 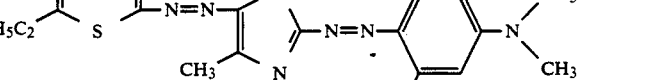 | Ni²⁺ |
|  | Ni²⁺ |
We claim:

1. A metal chelate compound of a dis-azo compound represented by the following Formula (I) with a metal:

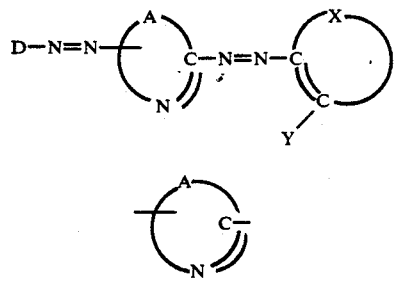

is selected from the group consisting of

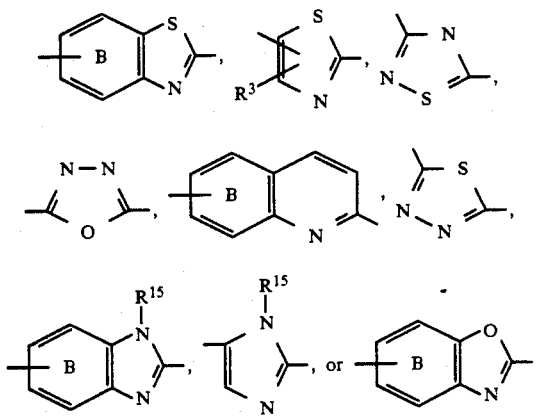

wherein ring B may be substituted by a $C_{1-6}$ alkyl group, a $C_{1-6}$ alkoxy group, or a halogen atom, $R^3$ is a hydrogen atom, a $C_{1-6}$ alkyl group, a $C_{1-6}$ alkoxy group, a halogen atom or a $C_{1-12}$ aryl group, and $R^{15}$ is a hydrogen atom or a $C_{1-6}$ alkyl group, X is a residue forming an aromatic group together with the two carbon atoms to which it is bonded, D is an aromatic residue which may have a substituent, or a heterocyclic amine residue which may have a substituent, and Y is a group having active hydrogen.

2. The metal chelate compound according to claim 1, wherein the residue X in the formula (I) has at least one substituent selected from the group consisting of $—NR^1R^2$ wherein each of $R^1$ and $R^2$ which are independent from each other, is a hydrogen atom, a $C_{1-20}$ alkyl group which may have a substituent, a $C_{1-12}$ aryl group which may have a substituent, a $C_{2-10}$ alkenyl group which may have a substituent, or a $C_{3-10}$ cycloalkyl group which may have a substituent, a $C_{1-6}$ alkyl group, a $C_{1-6}$ alkoxy group, and a halogen atom.

3. The metal chelate compound according to claim 1, wherein the residue D in the formula (I) is the one selected from the group consisting of residues represented by the following formulas:

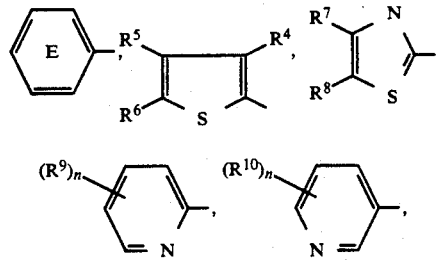

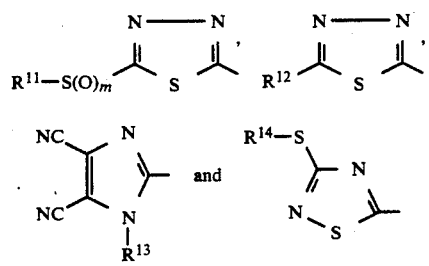

wherein ring E may have a substituent, each of the substituent of ring E, $R^4$, $R^5$, $R^6$, $R^7$, $R^8$, $R^9$ and $R^{10}$ which are independent from one another, is a $C_{1-20}$ alkyl group, a $C_{3-10}$ cycloalkyl group which may be substituted by a $C_{1-20}$ alkyl group, a $C_{1-20}$ alkoxy group, a nitro group, a cyano group, —COOR$^{17}$, wherein R$^{17}$ is a $C_{1-20}$ alkyl group, a $C_{3-10}$ cycloalkyl group which may have a substituent, or a phenyl group which may have a substituent, a phenyl group which may be substituted by a $C_{1-20}$ alkyl group or a $C_{1-20}$ alkoxy group, a $C_{1-10}$ alkylsulfonyl group, a halogen atom, or a $C_{10-3}$ perfluoroalkyl group, n is a 1 or 2, and m is 1, 2 or 3.

4. The metal chelate compound according to claim 1, wherein the substituent Y in the formula (I) is the one selected from the group consisting of —OH, —SH, —COOH, —SO$_2$H, —SO$_3$H, —NH$_2$, B(OH)$_2$, —PO(OH)$_2$, —NHR$^{16}$, —NHCOR$^{16}$ and —NHSO$_2$R$^{16}$ wherein R$^{16}$ is a $C_{1-6}$ alkyl group, a $C_{1-6}$ alkoxy group, a phenyl group which may be substituted by a halogen atom, or a $C_{1-6}$ alkyl group which may be substituted by a halogen atom, or a salt thereof.

5. The metal chelate compound according to claim 1, wherein the dis-azo compound is a dis-azo compound represented by the following formula (II):

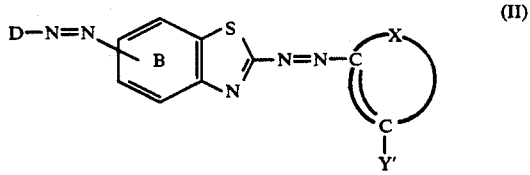

wherein ring B may be substituted by a $C_{1-6}$ alkyl group, a $C_{1-6}$ alkoxy group, or a halogen atom, X is a residue forming an aromatic group together with the two carbon atoms to which it is bonded, D is an aromatic residue which may have a substituted, or a heterocyclic amine residue which may have a substituent, and Y' is —COOH, —SO$_3$H, or a salt thereof.

6. The metal chelate compound according to claim 1, wherein the dis-azo compound is a dis-azo compound represented by the following formula (III):

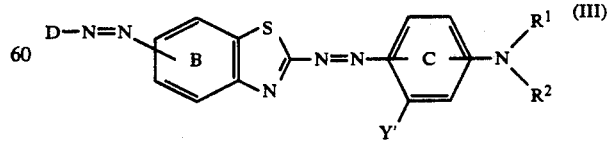

wherein ring B may be substituted by a $C_{1-6}$ alkyl group, a $C_{1-6}$ alkoxy group, or a halogen atom, D is an aromatic residue which may have a substituent, or a heterocyclic amine residue which may have a substituent, Y' is —COOH, —SO$_3$H, or a salt thereof, and each of R$^1$ and R$^2$ which are independent from each other, is a hydrogen atom, a C$_{1-20}$ alkyl group which may have a substituent, A C$_{6-12}$ aryl group which may have a substituent, a C$_{2-10}$ alkenyl group which may have a substituent, or a C$_{3-10}$ cycloalkyl group which may have a substituent, and ring C may have a substituent.

7. The metal chelate compound according to claim 1, wherein the dis-azo compound is a dis-azo compound represented by the following formula (IV):

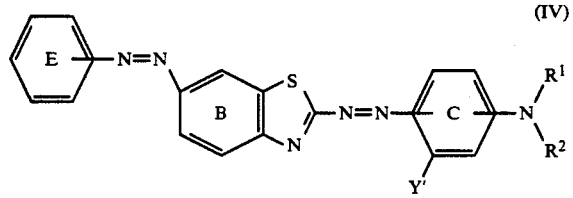

wherein ring B may be substituted by a C$_{1-6}$ alkyl group, a C$_{1-6}$ alkoxy group, or a halogen atom, Y' is —COOH, —SO$_3$H, or a salt thereof, each of R$^1$ and R$^2$ which are independent from each other, is a hydrogen atom, a C$_{1-20}$ alkyl group which may have a substituent, a C$_{6-12}$ aryl group which may have a substituent, a C$_{2-10}$ alkenyl group which may have a substituent, or a C$_{3-10}$ cycloalkyl group which may have a substituent, and each of ring C and ring E may have a substituent.

8. The metal chelate compound according to claim 1, wherein the dis-azo compound is a dis-azo compound represented by the following formula (V):

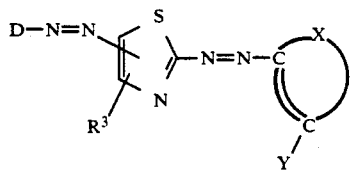

wherein X is a residue forming an aromatic group together with the two carbon atoms to which it is bonded, D is an aromatic residue which may have a substituent, or a heterocyclic amine residue which may have a substituent, Y is a group having active hydrogen, or a salt thereof, and R$^3$ is a hydrogen atom, a C$_{1-6}$ alkyl group, a C$_{1-6}$ alkoxy group, a halogen atom, or a C$_{1-12}$ aryl group.

9. The metal chelate compound according to claim 1, wherein the dis-azo compound is a dis-azo compound represented by the following formula (VI):

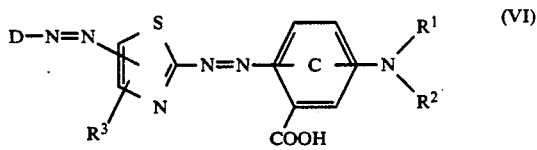

wherein D is an aromatic residue which may have a substituent, or a heterocyclic amine residue which may have a substituent, each of R$^1$ and R$^2$ which are independent from each other, is a hydrogen atom, a C$_{1-20}$ alkyl group which may have a substituent, a C$_{6-12}$ aryl group which may have a substituent, a C$_{2-10}$ alkenyl group which may have a substituent, or a C$_{3-10}$ cycloalkyl group which may have a substituent, R$^3$ is a hydrogen atom, a C$_{1-6}$ alkyl group, a C$_{1-6}$ alkoxy group, a halogen atom, or a C$_{1-12}$ aryl group, and ring C may have a substituent.

10. The metal chelate compound according to claim 1, wherein the dis-azo compound is a dis-azo compound represented by the following formula (VII):

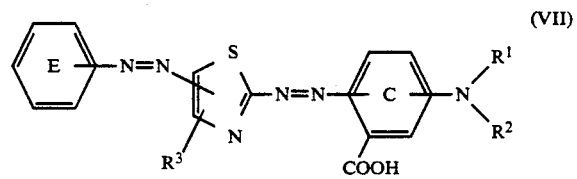

wherein each of R$^1$ and R$^2$ which are independent from each other, is a hydrogen atom, a C$_{1-20}$ alkyl group which may have a substituent, a C$_{6-12}$ aryl group which may have a substituent, a C$_{2-10}$ alkenyl group which may have a substituent, or a C$_{3-10}$ cycloalkyl group which may have a substituent, R$_3$ is a hydrogen atom, a C$_{1-6}$ alkyl group, a C$_{1-6}$ alkoxy group, a halogen atom, or a C$_{6-12}$ aryl group, and each of ring C and ring E may have a substituent.

* * * * *